United States Patent
Maeda et al.

(10) Patent No.: US 7,099,036 B2
(45) Date of Patent: Aug. 29, 2006

(54) IMAGE FORMING SYSTEM AND IMAGE FORMING METHOD

(75) Inventors: Yasutoshi Maeda, Ashigarakami-gun (JP); Katsuya Mitsutake, Ashigarakami-gun (JP); Koichi Yoshimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 919 days.

(21) Appl. No.: 10/093,614

(22) Filed: Mar. 11, 2002

(65) Prior Publication Data

US 2003/0048492 A1    Mar. 13, 2003

(30) Foreign Application Priority Data

Sep. 10, 2001  (JP) ............................ 2001-273577

(51) Int. Cl.
 *G06F 15/00* (2006.01)
 *G06F 15/16* (2006.01)
 *H04N 1/00* (2006.01)

(52) U.S. Cl. .................. 358/1.16; 358/1.15; 358/1.13; 358/404; 358/409; 358/438; 709/250

(58) Field of Classification Search ............... 358/1.16, 358/1.15, 1.13, 404, 409, 438; 709/250
See application file for complete search history.

(56) References Cited

U.S. PATENT DOCUMENTS

| | | | | |
|---|---|---|---|---|
| 5,272,468 A | * | 12/1993 | Read | 345/604 |
| 5,627,653 A | * | 5/1997 | Nakazato | 358/300 |
| 5,648,800 A | * | 7/1997 | Takeda | 345/45 |
| 6,552,819 B1 | * | 4/2003 | Osawa et al. | 358/1.17 |
| 6,697,898 B1 | * | 2/2004 | Shishizuka et al. | 710/107 |

FOREIGN PATENT DOCUMENTS

JP    A 7-132666    5/1995

* cited by examiner

*Primary Examiner*—King Y. Poon
*Assistant Examiner*—Chan S. Park
(74) *Attorney, Agent, or Firm*—Oliff & Berridge, PLC

(57) ABSTRACT

Print control program, by its constituent portions in cooperation with a scanner apparatus, spools image data sent from the scanner apparatus and controls the print engine etc. of the printer apparatus to print out the spooled image data. The print control program prepares job attribute information used for obtaining the output rate of the printer apparatus, calculates an anticipatory spool amount based on the job attribute information of the printer apparatus thus prepared and job attribute information received from the scanner apparatus, and adjusts timing for printing out the spooled image data.

21 Claims, 22 Drawing Sheets

FIG. 12

| NO. | SHEET INPUT DEVICE IDENTIFICATION INFORMATION | COPY JOB ATTRIBUTE INFORMATION | INPUT RATE CHARACTERISTIC INFORMATION | INPUT RATE CHARACTERISTIC INFORMATION HOLDING NUMBER |
|---|---|---|---|---|
| 1 | ……… | ……… | ……… | ……… |
| 2 | ……… | ……… | ……… | ……… |
| 3 | ……… | ……… | ……… | ……… |

FIG. 13

| NO. | COPY JOB ATTRIBUTE INFORMATION | OUTPUT RATE CHARACTERISTIC INFORMATION |
|---|---|---|
| 1 | ……… | ……… |
| 2 | ……… | ……… |
| 3 | ……… | ……… |

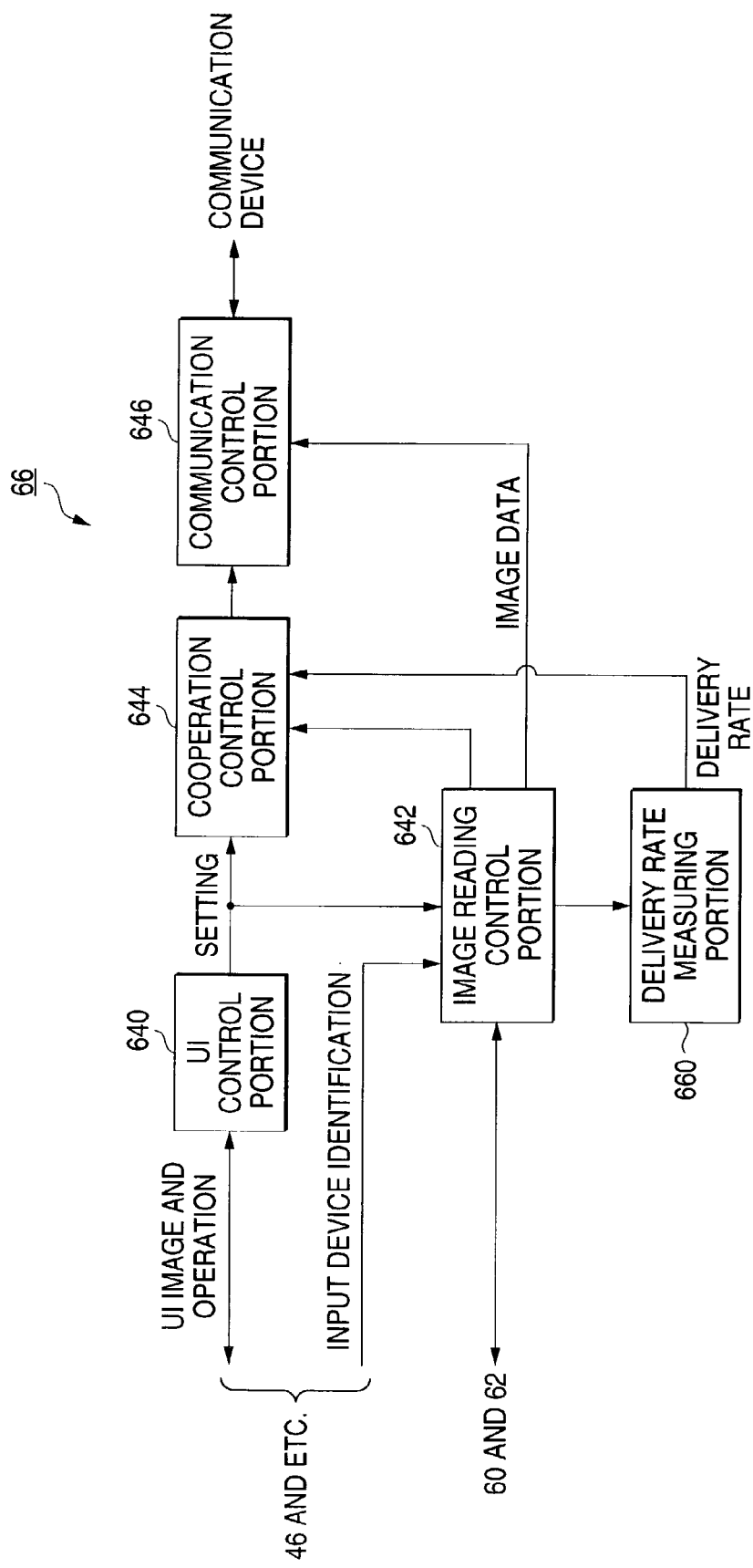

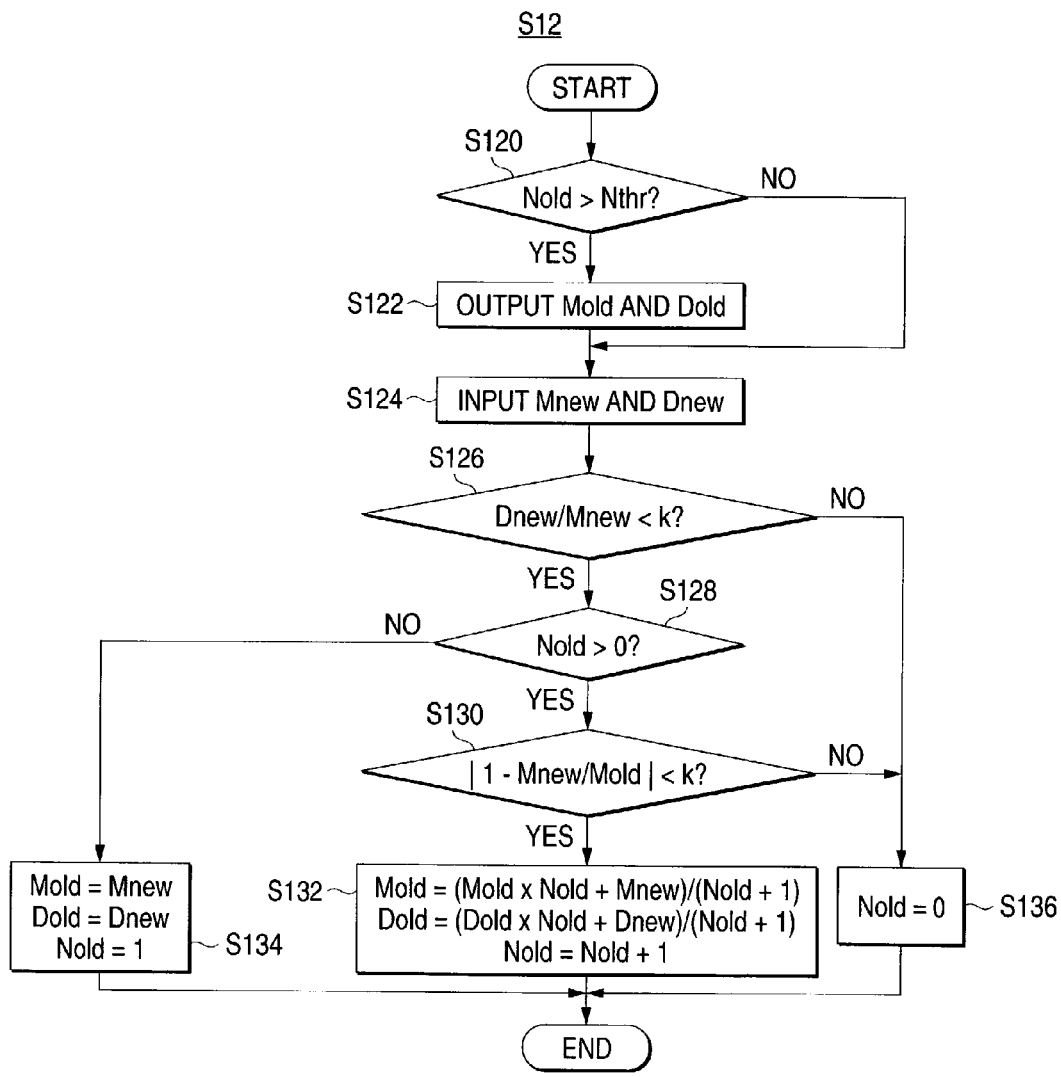

FIG. 22

Mnew: PAGE INPUT RATE AVERAGE INPUT VALUE
Dnew: PAGE INPUT RATE STANDARD DEVIATION INPUT VALUE
Mold: PAGE INPUT RATE AVERAGE HOLDING VALUE
Dold: PAGE INPUT RATE STANDARD DEVIATION HOLDING VALUE
Nold: INPUT RATE CHARACTERISTIC INFORMATION HOLDING NUMBER,
      WHERE EACH OF THE ABOVE VALUES IS RELATED TO THE COMBINATION
      OF THE SAME SHEET INPUT DEVICE AND THE SAME COPY JOB ATTRIBUTE
k: COEFFICIENT (0 < k1)
Nthr: DETERMINATION THRESHOLD Mnew: PAGE OUTPUT RATE AVERAGE INPUT VALUE
Dnew: PAGE OUTPUT RATE STANDARD DEVIATION INPUT VALUE
Mold: PAGE OUTPUT RATE AVERAGE HOLDING VALUE
Dold: PAGE OUTPUT RATE STANDARD DEVIATION HOLDING VALUE
Nold: INPUT RATE CHARACTERISTIC INFORMATION HOLDING NUMBER,
WHERE EACH OF THE ABOVE VALUES IS RELATED TO THE SAME
COPY JOB ATTRIBUTE

FIG. 24

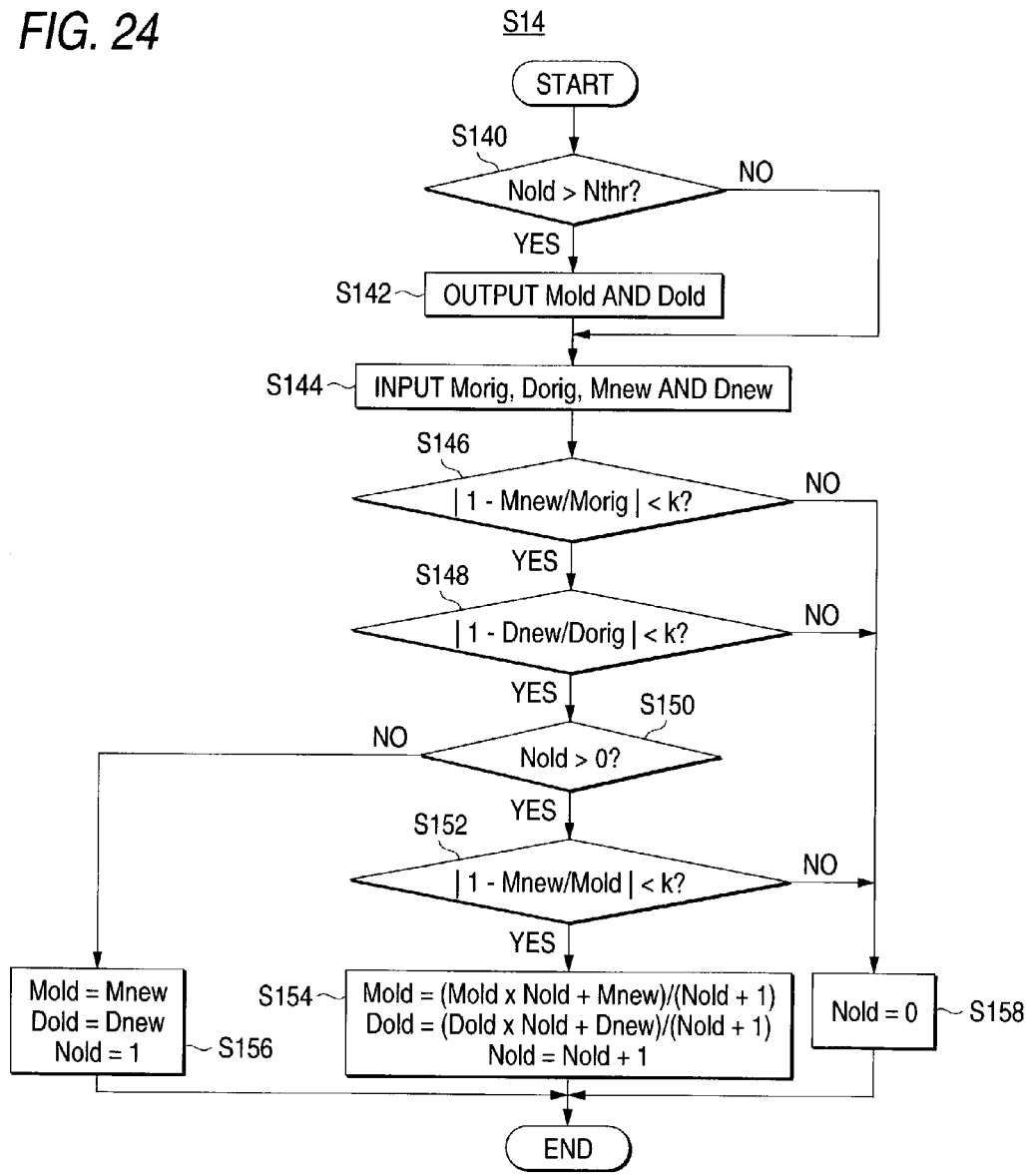

Morig: PAGE DELIVERY RATE AVERAGE VALUE
Dorig: PAGE DELIVERY RATE STANDARD DEVIATION INPUT VALUE
Mnew: PAGE INPUT RATE AVERAGE INPUT VALUE
Dnew: PAGE INPUT RATE STANDARD DEVIATION INPUT VALUE
Mold: PAGE INPUT RATE AVAERAGE HOLDING VALUE
Dold: PAGE INPUT RATE STANDARD DEVIATION HOLDING VALUE
Nold: INPUT RATE CHARACTERISTIC INFORMATION HOLDING NUMBER
k: COEFFICIENT (0 < k1)
Nthr: DETERMINATION THRESHOLD Min: PAGE INPUT RATE AVERAGE INPUT VALUE
Din: PAGE INPUT RATE STANDARD DEVIATION INPUT VALUE
Mout: PAGE OUTPUT RATE AVERAGE INPUT VALUE
Dout: PAGE OUTPUT RATE STANDARD DEVIATION INPUT VALUE
Nspl: ANTICIPATORY SPOOL AMOUNT (PAGE NUMBER)
Ndoc: TOTAL PAGE NUMBER WITHIN DOCUMENT

IMAGE FORMING SYSTEM AND IMAGE FORMING METHOD

BACKGROUND OF THE INVENTION

1. Field of the Invention

The present invention relates to an image forming system and a method therefor for receiving image data generated substantially at a constant data rate, buffering the received image data so as to prevent underflowing, and forming an image.

2. Description of the Related Art

It is sometimes desired to connect a scanner apparatus and a high speed printer apparatus through a network to print (form) image data read by the scanner apparatus by the printer apparatus.

Such printing processing is also called "network distributed copy processing."

In such a case, the image data transmitted by the scanner apparatus is received by the high speed printer apparatus, and once buffered (spooled) before printing.

In such a case, the high speed printer generally feeds output sheets very rapidly for printing, so that if image data underflows in the high speed printer apparatus, output sheets without printing can be discharged.

Therefore, conventionally, the high speed printer apparatus employs a method of receiving all image data, spooling the received image data and then starting printing.

When the method of the prior art technique 1 is employed to start printing after all image data has been received in this manner, the printing cannot be performed during the reception of the image data, as a matter of course.

Therefore, the operating rate of the high speed printer apparatus is reduced, and a longer time is required for the printing.

Also, for reducing a delay of starting the output while avoiding underflowing of data, the field of real time media transfer such as audio, moving image and the like, for example, may employ a method of measuring an input rate to a buffer before output processing to find a minimally required amount of anticipatory buffering for absorbing fluctuations in an output rate from the buffer.

However, this method does not ensure to avoid underflowing of data.

For example, even if underflowing occurs while a moving image is being displayed, this will cause disturbance or the like in an image without leaving the result as a specific object, so that the prior art technique permits more or less the occurrence of underflowing based on such an aspect.

On the other hand, if image data for a high speed printer apparatus underflows, a defectively printed output sheet is discharged as a specific object as a result of a failure due to the underflowing, for example, as shown in JP-A-Hei. 7-132666.

Therefore, the latter method cannot be applied to the network distributed copy.

The invention has been made in view of the aforementioned problems of the prior art, and it is an object to provide an image forming system and a method therefor which in an image forming apparatus before receiving all image data generated in an image generation apparatus.

SUMMARY OF THE INVENTION

[Image Forming System]

In order to attain the aforesaid object, according to the invention, there is provided an image forming system having:

an image generation apparatus; and
an image forming apparatus,
wherein the image generation apparatus has:
    a generating section for generating image data at a first data rate; and
    a transmitting section for transmitting first data rate information indicating the first data rate and the generated image data to the image forming apparatus,
wherein the image forming apparatus has:
    a receiving section for receiving the transmitted first data rate information and the transmitted image data;
    a storing section for storing the received image data;
    an image forming section for forming an image from the stored image data at a second data rate; and
    a calculating section for calculating a data amount of image data which should be stored from a time when the reception of the image data is started to a time when the formation of the image is started based on the received first data rate information and the second data rate, and
wherein the image forming section of the image forming apparatus starts the formation of the image from the stored image data when the calculated data amount of image data is stored.

Preferably, the first data rate information includes identification information for identifying the generating section and process attribute information for specifying at least one of the image generation by the image generation apparatus and the image forming processing by the image forming apparatus.

Preferably, the image forming apparatus further has a third measuring section for measuring third data rate indicating a data rate of the received image data and the calculating section of the image forming apparatus calculates the data amount of image data which should be stored from the time when the reception of the image data is started to the time when the formation of the image is started based on the received first data rate information, the second data rate, and the measured third data rate.

Preferably, the image forming apparatus further has a second measuring section for measuring the second data rate of the image forming section and the calculating section of the image forming apparatus calculates the data amount of image data which should be stored from the time when the reception of the image data is started to the time when the formation of the image is started based on at least the received first data rate information and the measured second data rate.

Preferably, the image generation apparatus further has a first measuring section for measuring the first data rate of the generating section and the transmitting section of the image generation apparatus transmits the measured first data rate to the image forming apparatus.

Preferably, the image generation apparatus further has a first measuring section for measuring the first data rate of the generating section, the transmitting section of the image generation apparatus transmits the measured first data rate to the image forming apparatus, the image forming apparatus further has:

a second measuring section for measuring the second data rate of the image forming section; and
    a third measuring section for measuring a third data rate indicating a data rate of the received image data, and the calculating section of the image forming apparatus calculates the data amount of image data which should be stored from the time when the reception of the image data is started to the time when the formation of the image is started based on the received first data rate information, the measured second data rate, and third data rate.

Preferably, the image forming apparatus forms the image from the stored image data at the second data rate lower than the first data rate.

Preferably, at least one of a case where the transmitted image data is delayed and a case where the image is formed earlier, the calculating section calculates the data amount of image data which should be stored from the time when the reception of the image data is started to the time when the formation of the image is started so that the image data has been stored in the storing section.

Preferably, the image forming apparatus is a printer apparatus for printing the stored image data on an output sheet.

Preferably, the image generation apparatus is a scanner apparatus connected to the printer apparatus through a network for sending a document at a constant rate, generating image data of the sent document, and transmitting the generated image data to the printer apparatus through the network.

Preferably, the first data rate information includes at least one of whether the image generation apparatus has an automatic document feeding device, whether the automatic document feeder device is in use, an order of feeding documents, whether the image generation apparatus has a function of reading a double-sided document, whether the function of reading a double-sided document is in use, and the size of document and the process attribute information includes at least one of information indicating a resolution of a formed image, information indicating number of gradation levels of the formed image, information indicating type of the document, and information indicating image processing performed by the generating section of the image generation apparatus.

Preferably, the process attribute includes at least one of information indicating whether the image forming apparatus has a post-processing device, whether the post-processing device is in use, an order of forming the image, whether the image forming apparatus has a function of forming double-sided images, whether the function of forming double-sided images is in use, the size of the document, a resolution of the image formation, and type of the document.

Preferably, the first data rate is substantially constant.

[Image Generation Apparatus]

According to the invention, there is provide an image generation apparatus for an image forming system comprising an image forming apparatus, the image generation apparatus having:
 a generating section for generating image data at a first data rate; and
 a transmitting section for transmitting a first data rate information indicating the first data rate and the generated image data to the image forming apparatus, in which the image forming apparatus receives first data rate information indicating the data rage of the generated image data and the image data, stores the received image data, forms an image at a second data rate from the stored image data, calculates a data amount of image data which should be stored from a time when the reception of the image data is started to a time when the formation of the image is started, and starts the formation of an image from the stored image data when the calculated data amount of image data is stored.

[Image Forming Apparatus]

According to the invention, there is provided an image forming apparatus having:
 a receiving section for receiving transmitted first data information and transmitted image data;
 a storing section for storing the received image data;
 an image forming section for forming an image from the stored image data at a second data rate; and
 a calculating section for calculating a data amount of image data which should be stored from a time when the reception of the image data is started to a time when the formation of the image is started based on the received first data rate information and the second data rate, in which the image forming section of the image forming apparatus starts the formation of an image from the stored image data when the calculated data amount of image data is stored.

[Image Generating/Forming Method]

According to the invention there is provided an image generating/forming method having the steps of:
 generating image data at a first data rate;
 transmitting first data rate information indicating the first data rate and the generated image data;
 receiving the transmitted first data rate information and the transmitted image data;
 storing the received image data;
 forming an image from the stored image data at a second data rate;
 calculating a data amount of image data which should be stored from a time when the reception of the image data is started to a time when the formation of the image is started based on the received first data rate information and the second data rate; and
 starting the formation of an image from the stored image data when the calculated data amount of image data is stored.

[Image Generating Method]

According to the invention, there is provided an image generating method for generating image data for forming an image, the method comprising the steps of:
 generating image data at a first data rate; and
 transmitting first data rate information indicating the first data rate and the generated image data, in which an image formation is performed by receiving the first data rate information indicating a data rate of the generated image data and the generated image data, storing the received image data, forming an image from the stored image data at a second data rate, calculating a data amount of image data which should be stored from a time when the reception of the image data is started to a time when the formation of the image is started based on the received first data rate information and the second data rate, and starting the formation of an image from the stored image data when the calculated data amount of image data is stored.

[Image Forming Method]

According to the invention, there is provided an image forming method having the steps of:
 receiving transmitted first data rate information, and transmitted image data;
 storing the received image data;
 forming an image from the stored image data at a second data rate;
 calculating a data amount of image data which should be stored from a time when the reception of the image data is started to a time when the formation of the image is started based on the received first data rate information and the second data rate; and starting the formation of an image from the stored image data when the calculated data amount of image data is stored.

[First Program]

According to the invention, there is provided a first program for causing a first computer to execute the steps of:
generating image data at a first data rate;
transmitting first data rate information indicating the first data rate and the generated image data, and causing a second computer to execute the steps of:
receiving the transmitted first data rate information and the transmitted image data;
storing the received image data;
forming an image from the stored image data at a second data rate;
calculating a data amount of image data which should be stored from a time when the reception of the image data is started to a time when the formation of the image is started based on the received first data rate information and the second data rate; and
starting the formation of an image from the stored image data when the calculated data amount of image data is stored.

[Second Program]

According to the invention, there is provided a second program for generating image data for forming an image, the program for causing a computer to execute the steps of:
generating image data at a first data rate; and
transmitting first data rate information indicating the first data rate and the generated image data, in which an image formation is performed by receiving the first data rate information indicating a data rate of the generated image data and the generated image data, storing the received image data, forming an image from the stored image data at a second data rate, calculating a data amount of image data which should be stored from a time when the reception of the image data is started to a time when the formation of the image is started based on the received first data rate information and the second data rate, and starting the formation of an image from the stored image data when the calculated data amount of image data is stored.

[Third Program]

According to the invention, there is provided a third program for forming an image from image data, the program for causing a computer to execute the steps of:
receiving transmitted first data rate information, and transmitted image data;
storing the received image data;
forming an image from the stored image data at a second data rate;
calculating a data amount of image data which should be stored from a time when the reception of the image data is started to a time when the formation of the image is started based on the received first data rate information and the second data rate; and
starting the formation of an image from the stored image data when the calculated data amount of image data is stored.

[Description of Image Forming System]

Here, an image forming system according to the invention will be described with reference to an example.

The example shown below is intended to embody the invention for facilitating the understanding the invention, and is not at all intended to limit the technical scope of the invention.

As described above, conventionally, image data is generally transmitted from an image generation apparatus (for example, a scanner apparatus) to an image forming apparatus (for example, a high speed printer apparatus), and when printing, the printing of image data is started after all the image data is received by the image forming apparatus (high speed printer apparatus).

On the other hand, when a scanner apparatus is provided with an automatic document feeding device, it is generally know how many number of document images is read per unit time in the scanner apparatus.

Also, if the type of printing processing (attribute of printing processing) is known, it is generally known in the high speed printer apparatus how many pages can be printed per unit time.

Also, a time required for printing is generally longer than a time required for reading a document.

Up to now, no attempt has been made at all to reduce a time required for the printing processing, taking advantage of such known matter.

The image forming system according to the invention, relying on such a known matter, is configured to start printing at the time such a data amount of image data is spooled (stored) that no underflowing will occur even if printing processing is performed to the end, thereby reducing a printing time.

Specifically, the image generation apparatus (scanner apparatus) transmits information (first data rate information) required to find out a data amount of image data which should be previously spooled in order to prevent the underflowing, for example, information for identifying the type of a scanner apparatus, a processing attribute of the scanner apparatus indicative of how an image is read in the scanner apparatus, and a data rate (first data rate, delivery rate) of image data generated in the scanner apparatus, to the image forming apparatus.

The image forming apparatus calculates a data amount (anticipatory spool amount) of image data which should be previously spooled (anticipatory spool) based on the first data rate information, information (second data rate information) indicative of a data amount (second data rate, output rate) of image data which can be printed thereby per unit time, predicted from a processing attribute of the printer apparatus indicative of how image data is printed, a data rate (third data rate information) of image data received from the scanner apparatus, and a margin which should be taken into account for a delay in the transmission of the image data and the ensured accomplishment of printing processing, and starts printing when this data amount of image data has been received, thereby reducing the printing time.

BRIEF DESCRIPTION OF THE DRAWINGS

FIG. 12 shows a diagram showing an example of a table used for generating input rate characteristic information by a characteristic generation portion shown in FIG. 11.

FIG. 13 shows a diagram showing an example of a table used for generating output rate characteristic information by a characteristic generation portion shown in FIG. 11.

FIG. 21 shows a diagram showing the configuration of second scanner control program executed by the control device (FIG. 9) of the scanner apparatus.

FIG. 22 shows a flowchart showing a processing (S12) in which the characteristic generation portion updates an input rate characteristic table (FIG. 12) by using the measuring result of the input rate inputted from an input rate measuring portion in the second print control program shown in FIG. 20.

FIG. 24 shows a flowchart showing a processing (S14) in which the characteristic generation portion updates the input rate characteristic table (FIG. 12) by using the measuring result of the delivery rate received from the scanner control program (FIG. 21) and the measuring result of the input rate generated by the input rate measuring portion.

DETAILED DESCRIPTION OF THE PREFERRED EMBODIMENTS

Figure 1:
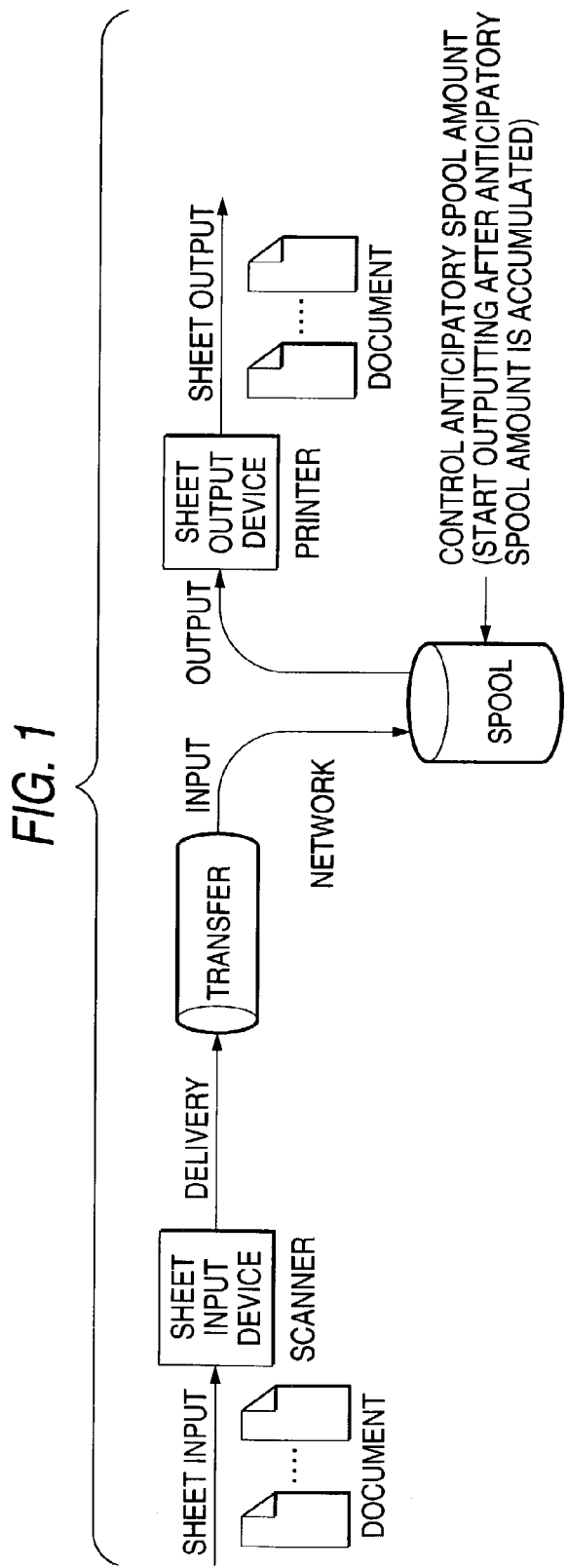
FIG. 1 shows a diagram illustrating an application of an anticipatory spool according to the invention.

FIG. 1 is a diagram illustrating an application of an anticipatory spool according to the invention.

Figure 2:
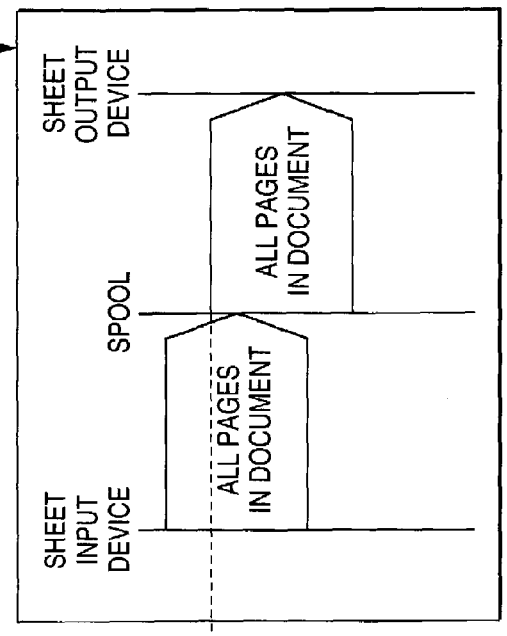
FIG. 2 shows a diagram for explaining the anticipatory spool according to the invention.
Figure 2:
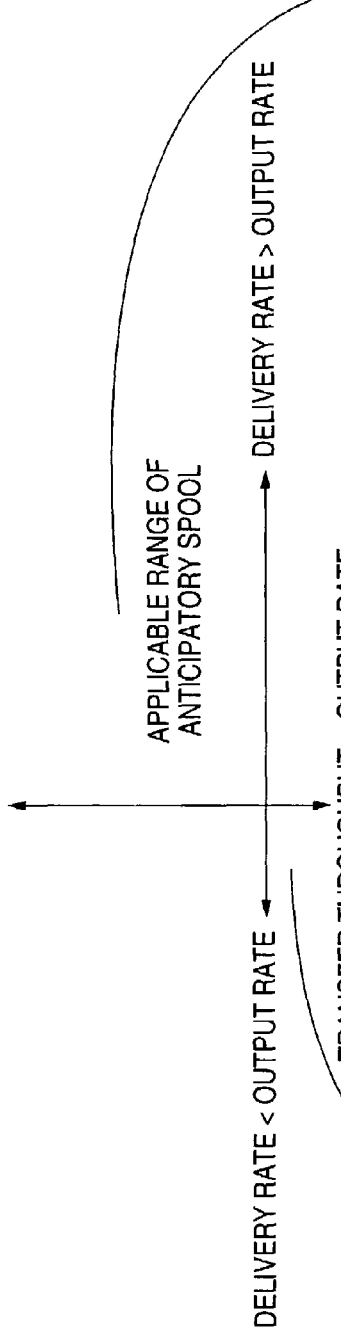
Figure 2:
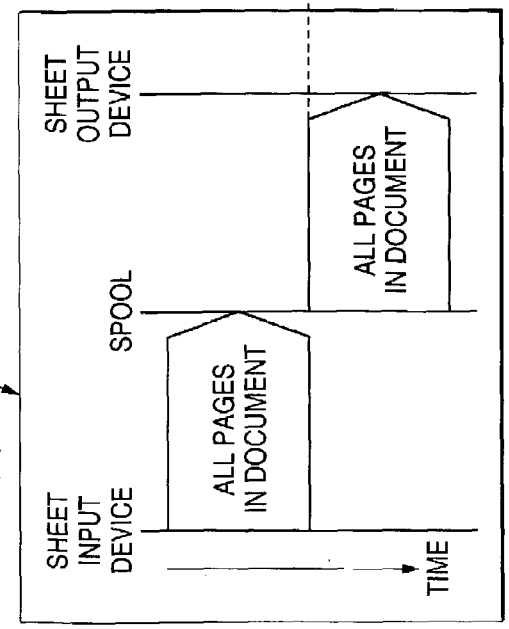

FIG. 2 is a diagram for explaining the anticipatory spool according to the invention.

Figure 3:
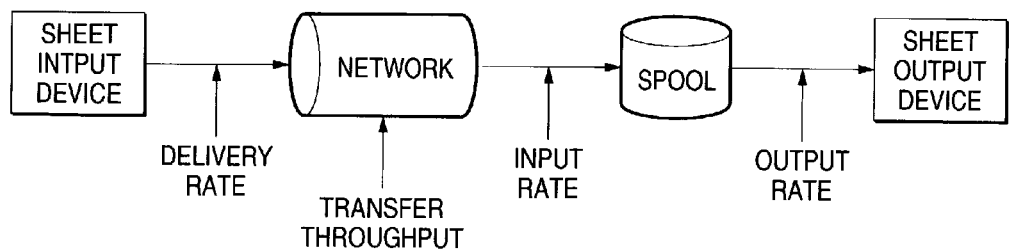
FIG. 3 shows a diagram showing terms appearing in the description.

FIG. 3 is a diagram showing terms appearing in the following description.

[Applicable Scope of Anticipatory Spool]

The anticipatory spool according to the invention is applied to network distributed copy processing which reads one page or more of sheet document by a sheet input device (for example, a scanner) connected through a network to generate image data which is transferred through the network and outputted from a sheet output device (for example, a printer), as illustrated in FIG. 1, and is used to control a data amount (anticipatory spool amount) of image data which should be spooled from the beginning of the reception of image data to the start of printing in order to prevent the image data spooled in the sheet output device from underflowing, as shown in FIG. 2(a).

Terms such as a sheet input device in the description are as shown in FIG. 3.

Here, for previously spooling an anticipatory spool amount of image data for rapidly outputting the image data on sheets, an input rate for the spooler must always exceed an output rate as in the first quadrant of a graph shown in FIG. 2(b), in which case its effectiveness is demonstrated in the form of a reduced delay in the start of output, as shown between FIGS. 2(a) and 2(c).

On the other hand, while a method of outputting image data on sheets after all the image data have been spooled may be applied in all quadrants of the graph shown in FIG. 2(b), a practical problem exists in that a sheet input rate generally exceeds a sheet output rate, so that the anticipatory spool can be applied to a majority of network distributed copy processing.

[When Anticipatory Spool Cannot be Applied]

However, even if the input rate for the spooler always exceeds the output rate, the anticipatory spool cannot be applied in some cases.

A specific example will be presented for describing the case where the anticipatory spool cannot be used.

Depending on the type of sheet output device, a printing side may face upward or face downward.

In a sheet output device which outputs sheets facing upward, the order of pages in an output result will be reversed unless the output is started from the last page of a document, so that when sheets are outputted upward, image data of all pages must be spooled and the finally spooled last page be printed first.

Therefore, for printing correctly ordered pages using a sheet output device which prints sheets facing upward, the anticipatory spool cannot be used even if the input rate for the spooler always exceeds the output rate, in which case, as shown in FIG. 2(c), image data of all pages must be previously spooled before outputting, as before.

[Relationship of Delivery Rate, Transfer Rate, etc.]

Here, a data delivery rate from a sheet input device has characteristics (average rate, temporal variations, bursty characteristic) depending on attributes of a copy job (sheet size, orientation and the like), and a mechanical operation of a particular sheet input device in accordance with the attribute.

Then, an input rate to the spool is given as the delivery rate from a particular sheet input device affected by a data transfer throughput in a network between devices.

Similar to the delivery rate, the output rate from the spool by a sheet output device also has characteristics (average rate, temporal variations, bursty characteristic) depending on attributes of a copy job (sheet size, orientation and the like), and a mechanical operation of the particular sheet output device in accordance with the attribute.

In recent years, network component devices in offices have changed from a repeater hub in which ports share a transmission bandwidth to a switching hub which reduces the contention for the bandwidth, and the transmission bandwidth for each port has been expanded to 100 Mbps–1 Gbps.

As a result, in an office network in such a scale that network devices including sheet input/output devices in an office are accommodated in a single switching hub, 100 Mps–1 Gbps is ensured as a transfer throughput between the devices.

On the other hand, the throughputs of sheet input by a sheet input device and of sheet output by a sheet output device are on the order of 10–100 pages/minute. Since image data of each page is compressed approximately by a factor of 2 to 5, a required value for the transfer throughput is in a range of 10 Mpbs to 600 Mbps for color documents of the most general A4 sheet size.

Specifically, when a sheet input device and a sheet output device are placed in different rooms in an office, the delivery rate of the sheet input device and the input rate of the sheet output device will not be affected by the transfer rate or will always be affected by the transfer rate to the same degree for the transfer throughput of a network in the office.

Moreover, since the delivery rate of the sheet input device and the output rate of the sheet output device have the characteristics depending on the attributes of copy job and the mechanical operations in accordance with the copy job, both can be predicted.

Figure 4:
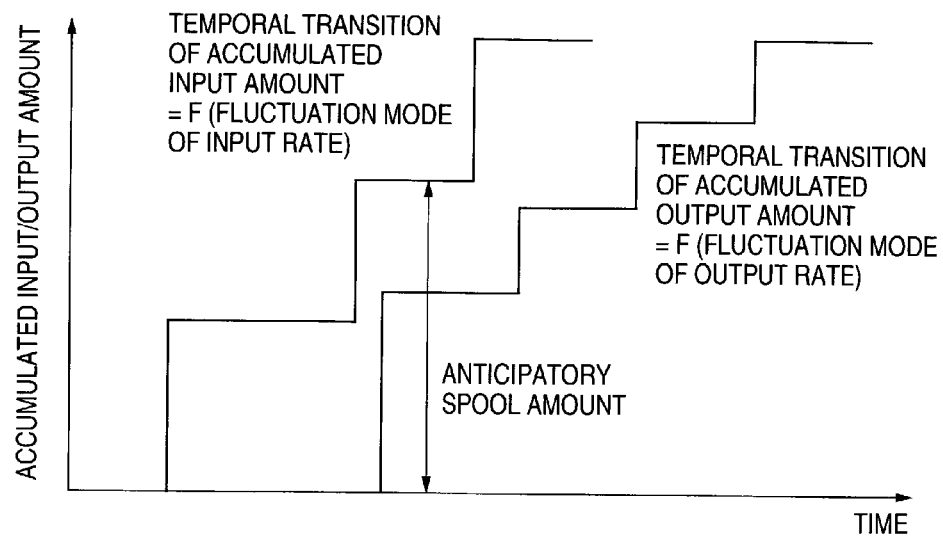
FIG. 4 shows a diagram showing a minimally required anticipatory spool amount.

FIG. 4 is a diagram showing a minimally required anticipatory spool amount.

Thus, for implementing network distributed copy processing using a sheet input device and a sheet output device which are interconnected with an extremely short distance interposed therebetween, such as a distance between two separate rooms in an office, an anticipatory spool amount can be correctly found based on a prediction of a delivery rate and an input rate, so that a delay in the start of output can be reduced by the anticipatory spool.

As described above, in the anticipatory spool according to the invention, the anticipatory spool amount is minimized based on the relationship among the delivery rate from the sheet input device, the transfer throughput of the network between the devices, and the output rate from the spool by the sheet output device, as shown in FIG. 4.

[Problems in Minimizing Anticipatory Spool Amount]

In the anticipatory spool according to the invention, there are the following problems for minimizing the anticipatory spool amount.

(Problem 1) For a combination of the attributes of a copy job to be executed and sheet input/output devices, it is previously determined whether or not the input rate to the spool is affected by the transfer throughput to fluctuate.

(Problem 2) When the input rate is not affected by the transfer throughput to fluctuate, the characteristics of the input rate (statistic amounts such as an average, a deviation and the like, or mode of temporal fluctuations, hereinafter "fluctuation mode") are correctly predicted.

(Problem 3) The characteristics of the output rate (statistic amounts such as an average, a deviation and the like, or the fluctuation mode) are correctly predicted.

(Problem 4) A minimally required anticipatory spool amount is found from the predicted characteristics of the input rate and characteristics of the output rate.

[Method for Solving the Problems]

The problem 1 and problem 2 can be solved from the following concepts.

(1) The sheet input/output devices, once installed, will not be relocated from the positions on the network for a relatively long term. Likewise, network component devices, once arranged, will not be increased or decreased for a relatively long term.

In other words, when viewed from the sheet output device, a data transfer path is relatively stationary between itself and each sheet input device.

Therefore, with the same combination of the attributes of copy job with the sheet input/output devices, it can be thought that the input rate to the spool is similarly affected each time by the transfer throughput of the data transfer path between the devices.

(2) In view of the foregoing relationship, a method of determining whether or not the input rate to the spool is affected by the transfer throughput involves previously holding, for a certain copy job attribute, an identifier of a sheet input device, the input rate of which is known to be not affected by the transfer throughput; a copy job attribute which is not affected by the transfer throughput; and the input rate characteristic in the combination.

(3) It is also readily possible to automatically determine whether or not the input rate to the spool is affected by the transfer throughput, provided that the input rate can be compared with the delivery rate.

The delivery rate can be observed in the sheet input device, so that if the result is transferred to the sheet output device and explicitly shown, it can be compared with the result of an observation on the input rate to the spool in the sheet output device.

(4) it is also possible to determine the presence or absence of the influence of the transfer throughput only using the result of the observation on the input rate, without relying on information on the delivery rate.

Specifically, when the transfer throughput on the path between the devices is temporarily excessive or short with respect to the delivery rate, large variations will be found in the result of the observation on the input rate, so that the result of observation must be different every time even with the same source sheet input device and copy job attributes.

Therefore, the influence of the transfer throughput can be determined by comparing the results of observations, derived from the same sheet input device and copy job observation, with each other, within the results of the observations on the input rate in anticipating copy jobs.

(5) Here, when not affected by the transfer throughput, as noted in the invention, no variations are found in the results of observations, derived from the same sheet input device and copy job observation, thereby making it possible to correctly reveal the characteristics of the input rate, using the results of observations.

The aforementioned problem 3 can be solved from the following concepts.

(6) Since the relationship between the spool and the sheet output device is not changed but fixed for each copy job, the output rate characteristics for each copy job attribute may be previously held in a fixed manner for each type of sheet output device.

Alternatively, when taking into account a difference by the type and aging changes of the relationship between the spool and the sheet output device, the result of observing the output rate from the spool may be used.

As the result of observing the input rate and output rate characteristics, statistic amounts such as their respective average, deviation and the like may be simply left, but a minimally required anticipatory spool amount can be more accurately calculated by recording the fluctuation mode.

This is because mechanical operations of the sheet input device and sheet output device generally include a transient operation at the beginning of a copy job (start of sheet feeding or start of sheet discharging), and a subsequent steady-state operation, and as a result, the input/output rates also present transient characteristics.

The aforementioned problem 4 can be solved by the following concepts.

(7) From the foregoing, in the spool, the input rate characteristics (statistic amounts such as an average, a deviation and the like, or the fluctuation made), and the delivery rate characteristics (statistic amounts such as an average, a deviation and the like, or the fluctuation made) can be provided from the attributes of a copy job before the copy job is executed.

(8) When the statistic amounts such as respective averages, deviations and the like are used as the input/output rate characteristics, the anticipatory spool amount may be chosen to be a data rate (or the number of pages) which includes a slight margin (one–two pages) for a data amount (number of pages) outputted at one time at the beginning of sheet output when a minimum of the input rate (average−deviation) exceeds a maximum of the output rate (average+deviation).

(9) Alternatively, when respective fluctuation modes are used as the input/output rate characteristics, a temporal transition of an accumulated input amount in the spool is found from the fluctuation mode of the input rate, a temporal transition of an accumulated output amount in the spool is found from the fluctuation mode of the output rate, as shown in FIG. 4, and the minimum anticipatory spool amount may be determined such that the former graph does not overlap the latter graph but always exceeds it.

Also, according to this method, even when an average input rate is below an average output rate, an anticipatory spool amount can be found for less than all pages of a document.

[First Embodiment]

The first embodiment of the image generating method and the image forming method using the anticipatory spooling according to the invention will be explained.

[Network System 1]

Figure 5:
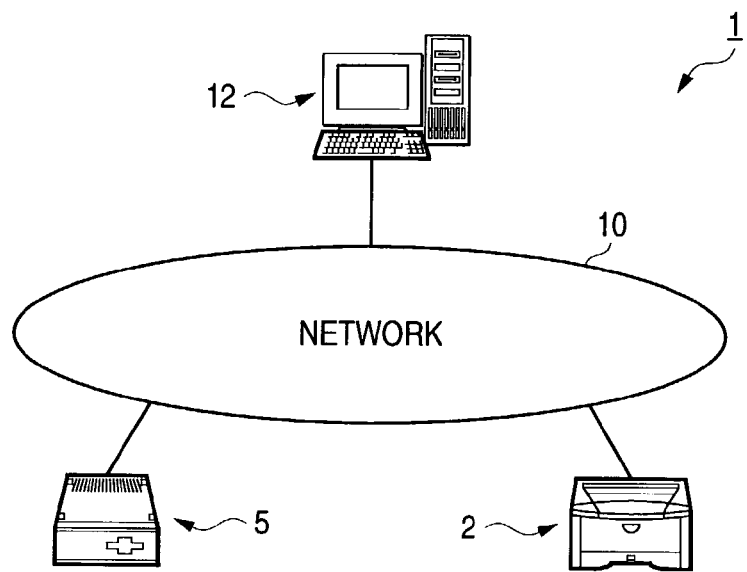
FIG. 5 shows a diagram showing an example of the configuration of a network system to which the image generating method and the image forming method using the anticipatory spooling according to the invention is applied.

FIG. 5 is a diagram showing an example of the configuration of a network system 1 to which the image generating method and the image forming method using the anticipatory spooling according to the invention is applied.

As shown in FIG. 5, the network system 1 is configured in a manner that nodes such as a printer apparatus 2, a scanner apparatus 6 and a computer (PC) 12 etc. are mutually coupled through a network 10 so as to be able to communicate from one another.

[Hardware Configuration]

First, the hardware configuration of the constituent portion of the network system 1 will be explained.

[Printer Apparatus 2]

Figure 6:
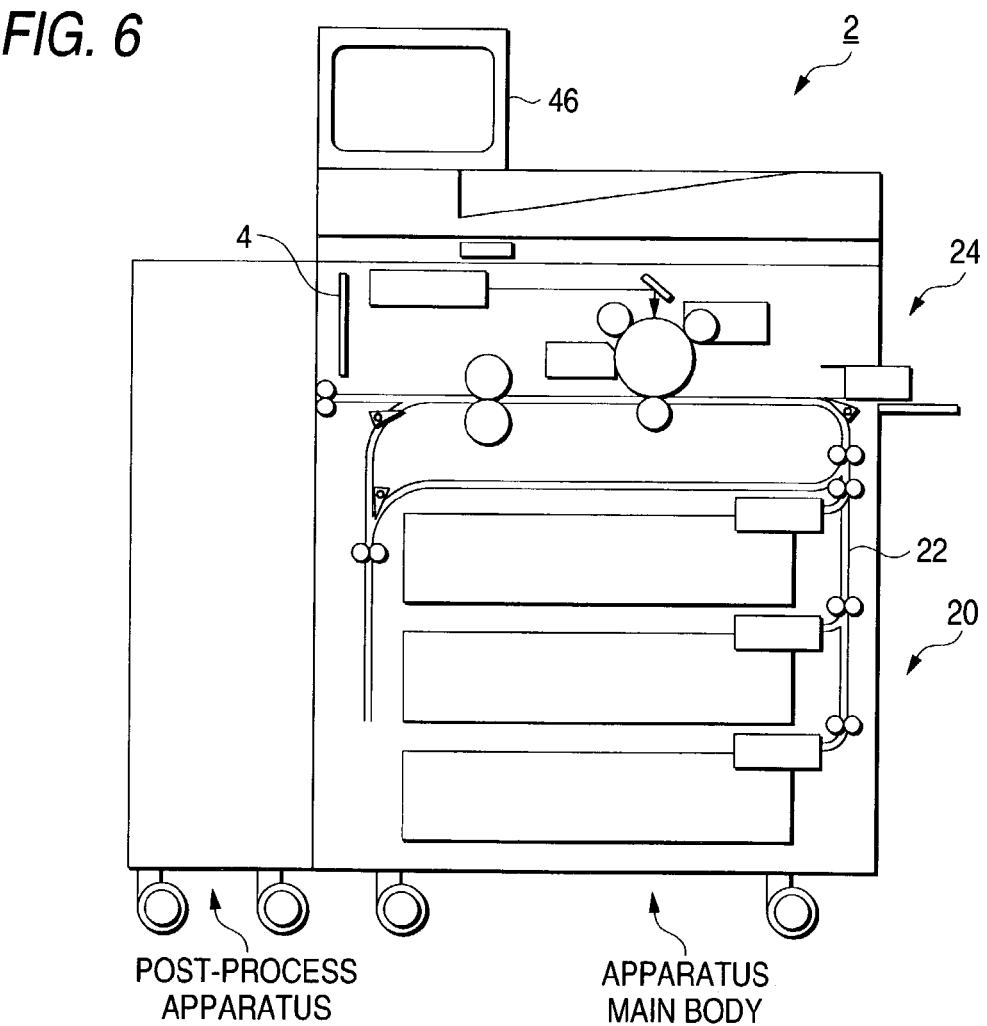
FIG. 6 shows a diagram showing the schematic configuration of a printer apparatus shown in FIG. 5.

FIG. 6 is a diagram showing the schematic configuration of the printer apparatus 2 shown in FIG. 5.

Figure 7:
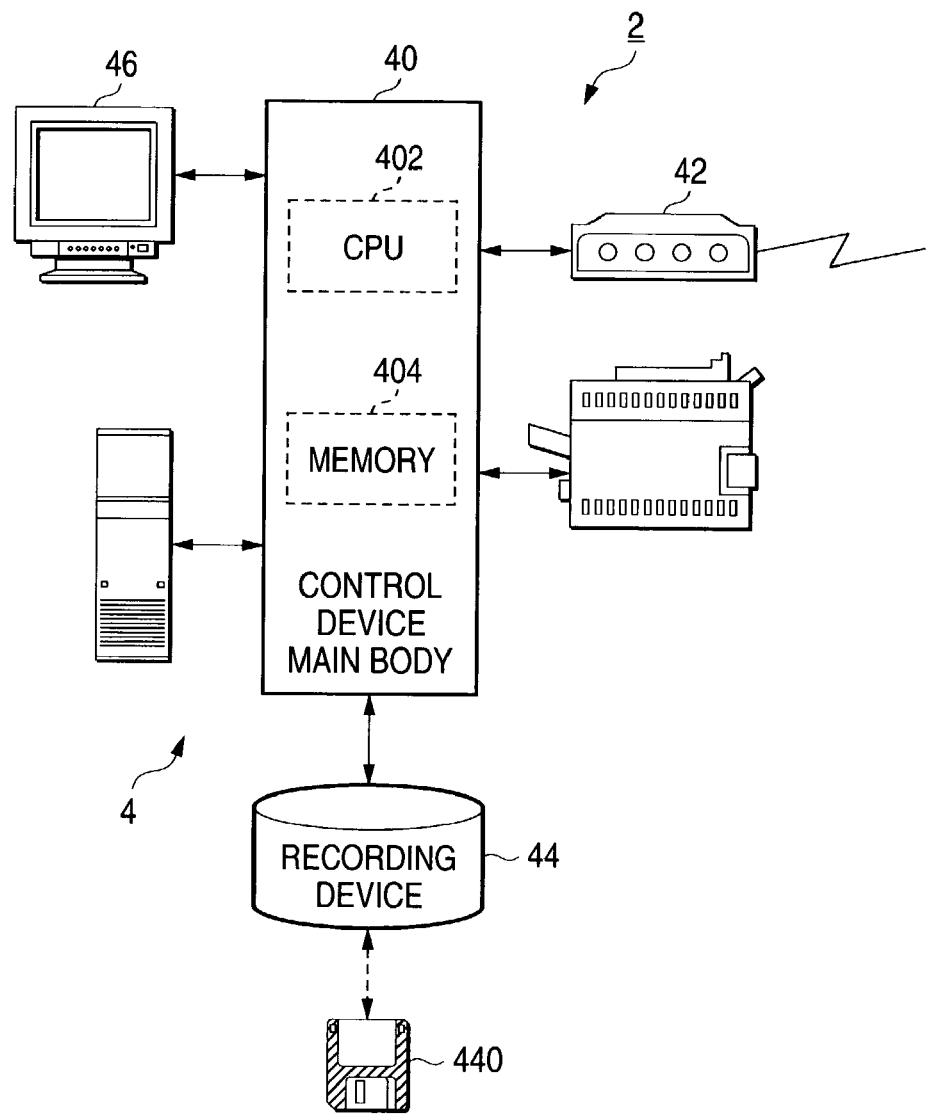
FIG. 7 shows a diagram showing the schematic configuration of the printer apparatus mainly illustrating the control device shown in FIG. 6.

FIG. 7 is a diagram showing the schematic configuration of the printer apparatus 2 mainly illustrating the control device 4 shown in FIG. 6.

As shown in FIG. 6, the printer apparatus 2 is provided with a post processing device which performs post-processings such as stapling and punching processings for printed output sheets in addition to an apparatus main body which performs the printing (image forming) processing for an output sheet.

The apparatus main body shown in FIG. 6 is constituted by the control device 4, a sheet tray portion 20, a sheet feeding portion 22, a printer engine 24 etc.

Further, as shown in FIG. 7, the control device 4 of the printer apparatus 2 shown in FIG. 6 is constituted by a control device main body 40 including a CPU 402 and a memory 404 etc., a communication device 42, a recording device 44 such as a HDD device capable of writing data in and reading date from a recording medium 440, and a display and input device 46 formed by an LCD display device and a touch panel etc.

That is, the printer apparatus 2 includes a constituent portion as a network printer which spools image data sent from other nodes such as the scanner apparatus 6, the PC 12 etc. through the network 10, prints out at a high speed the image data thus spooled, and performs the post-processing for printed output sheets.

[Scanner Apparatus 6]

Figure 8:
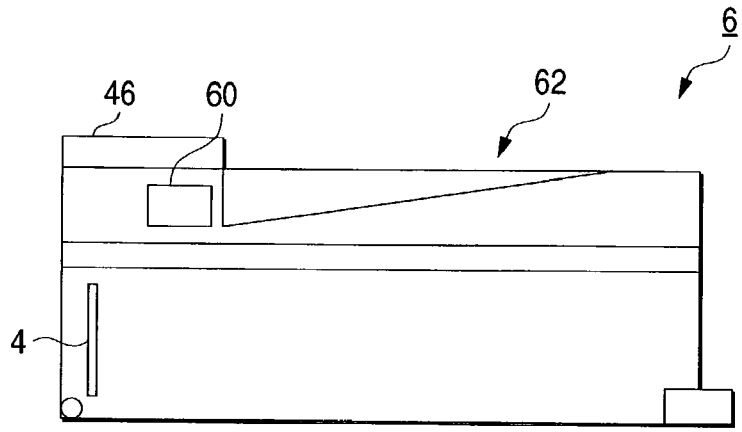
FIG. 8 shows a diagram showing the schematic configuration of a scanner apparatus shown in FIG. 5.

FIG. 8 is a diagram showing the schematic configuration of the scanner apparatus 6 shown in FIG. 5.

Figure 9:
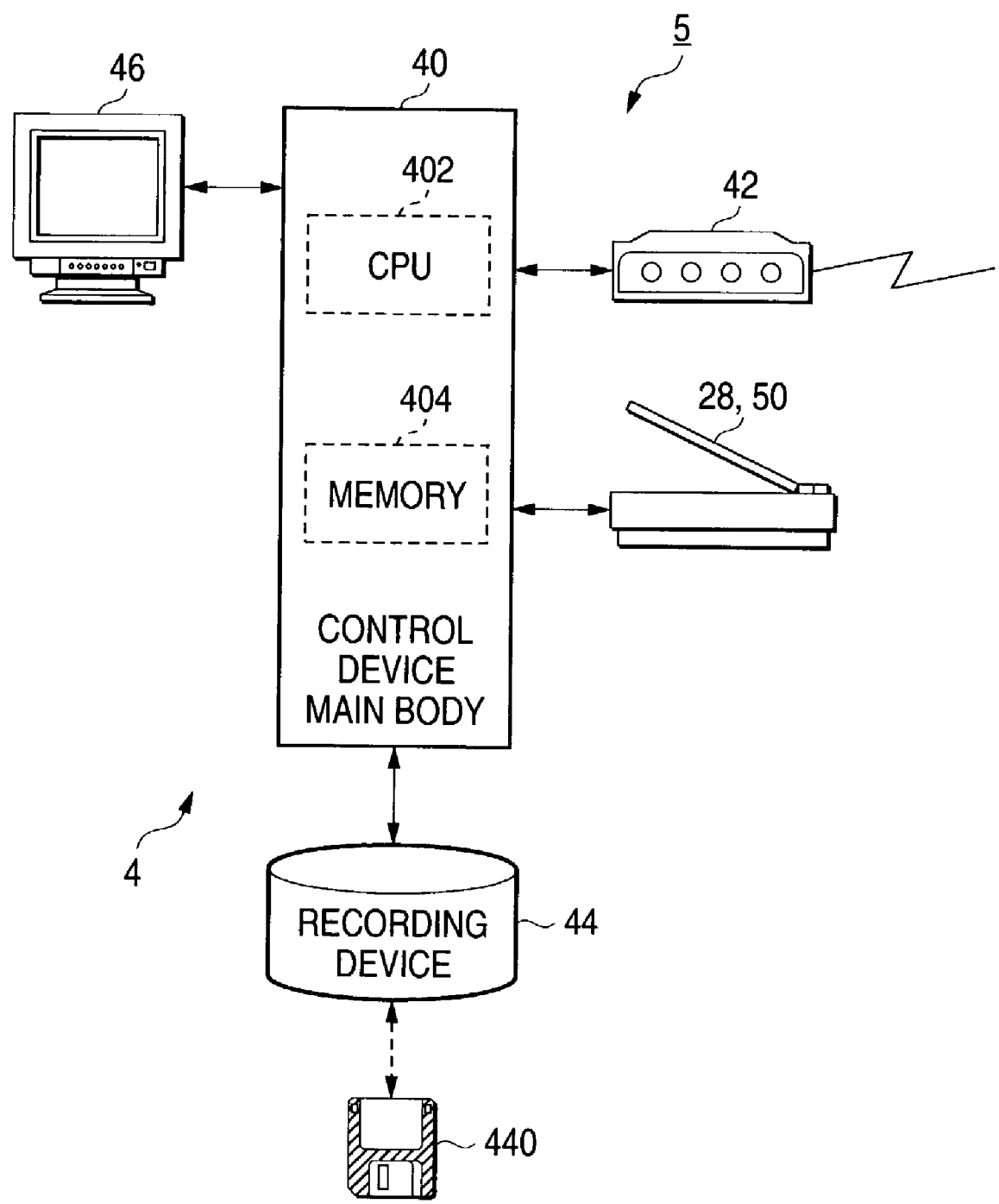
FIG. 9 shows a diagram showing the configuration of the scanner apparatus mainly illustrating the control device shown in FIG. 8.

FIG. 9 is a diagram showing the configuration of the scanner apparatus 6 mainly illustrating the control device 4 shown in FIG. 8.

Of the constituent portions of the scanner apparatus 6 shown in FIGS. 8 and 9, the portions which are substantially same as those of the printer apparatus 2 shown in FIGS. 6 and 7 are labeled with the same symbols.

As shown in FIG. 8, the scanner apparatus 6 includes the control device 4, a document feeding device 62 and an image reading device 60.

As shown in FIG. 9, the control device 4 of the scanner apparatus 6 has the constituent portion similar to that of the control device 4 of the printer apparatus 2.

That is, the scanner apparatus 6 includes a constituent portion as a network scanner which automatically feeds document by the document feeding device 62, reads the document and generates image data by the image reading device 60, and transmits the data to other nodes such as the printer apparatus 2 through the network 10.

Of the constituent portions of the network system 1 shown in FIG. 5 etc., the printer apparatus 2 corresponds to the sheet output device shown in FIG. 1 and the scanner apparatus 6 corresponds to the sheet input device shown in FIG. 1.

Further, the spool shown in FIG. 1 is realized in a manner that the control device 4 employs the recording device 44 and a memory 404 in the printer apparatus 2.

[Software Configuration]

Next, the explanation will be made as to the configuration of software, for realizing the image generating method and image forming method using the anticipatory spool according to the invention, which is supplied to the printer apparatus 2 and the scanner apparatus 6 shown in FIG. 5 etc. through a recording medium 440, loaded into the memories 404 of the control devices 4 of these apparatuses and executed.

[Scanner Control Program 64]

Figure 10:
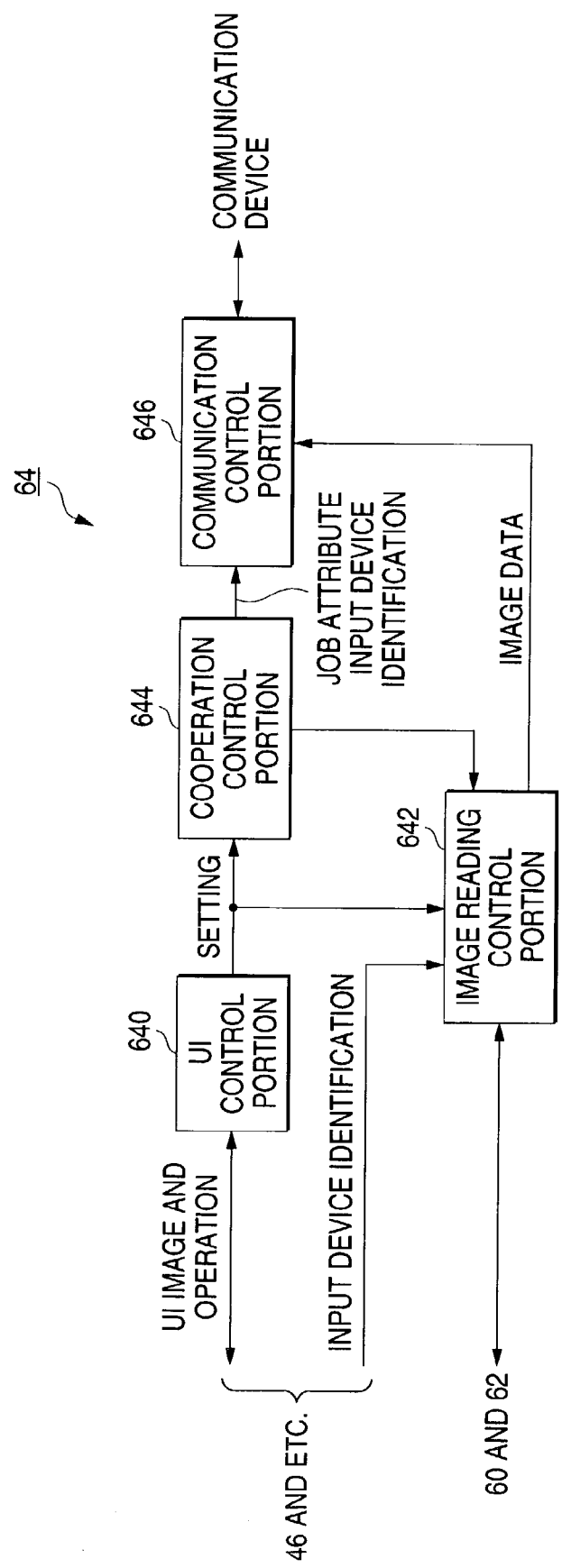
FIG. 10 shows a diagram showing the configuration of a first scanner control program executed in the scanner apparatus shown in FIG. 6 etc.

FIG. 10 is a diagram showing the configuration of a first scanner control program 64 executed in the scanner apparatus 6 shown in FIG. 6 etc.

As shown in FIG. 10, the first scanner control program 64 is configured by an user interface (UI) control portion 640, an image read control portion 642, a cooperation control portion 644 and a communication control portion 646.

The first scanner control program 64, in corporation with these constituent portions, controls the image reading device 60 and the document feeding device 62 to automatically feed and read the document set at the scanner apparatus 6 to generate image data and transmits the image data to the printer apparatus 2 (scanner function 1).

Further, the first scanner control program 64, in cooperation with the printer apparatus 2, transmits the image data to the printer apparatus 2 to print out the data (scanner function 2).

Furthermore, in order to prevent the underflowing in the printer apparatus 2, the scanner control program acts to transmit to the printer apparatus 2 information necessary for calculating an amount of image data (anticipatory spool amount) to be spooled in advance (anticipatory spool) before the start of the printing operation (scanner function 3).

[UI Control Portion 640]

The UI control portion 640 displays a user interface (UI) image on the display and input device 46 (FIG. 8) of the scanner apparatus 6, receives an operation with respect to the displayed image and outputs the operation as setting information to the respective constituent portions of the first scanner control program 64.

[Image Read Control Portion 642]

The image read control portion 642 controls the document feeding device 62 (FIG. 8) of the scanner apparatus 6 thereby to automatically feed one of more sheets of document set at the document feeding device 62 to the image reading device 60 almost at a constant speed.

The image read control portion 642 controls the image reading device 60 to read the document thus fed and generate image data by the image reading device 60 and store the image data in the memory 404 or the recording device 44 (FIG. 9) of the scanner apparatus 6.

Further, the image read control portion 642 outputs the image data thus stored to a communication control portion 646 in accordance with the control of a cooperation control portion 644.

[Cooperation Control Portion 644]

The cooperation control portion 644 generates job attribute information (processing attribute) based on user's setting performed with respect to the UI control portion 640

The cooperation control portion 644 holds the input device identification information of the scanner apparatus 6 and controls the communication control portion 646 to transmit the input device identification information thus held and the job attribute information thus generated to the printer apparatus 2 through the network 10.

In this respect, the job attribute transmitted to the printer apparatus 2 from the scanner apparatus 6 side includes information exemplarily shown in the following table 1, for example.

[Table 1: Job Attribute of the Scanner Apparatus 6]

Presence or non-presence of ADF (Automatic Document Feeder), and use or non-use of the ADF.

Input order of sheets (from top page or from last page)

Presence or non-presence of both sides input function and use or non-use of the function.

Sheet size of document (A6, A5, A4, A3, B6, B5, B4, letter, post card etc.), and input direction of the document (longitudinal direction, transversal direction).

Resolution of output (200 dpi (dots per inch), 300 dpi, 400 dpi, 600 dpi etc.) and gradation number (black and white 1 bpp (bits per pixel), gray 8 bpp, color 24 bpp etc.)

Kinds of document (photograph, graphics, characters, mixture etc.).

Input device side image processing, expansion/reduction, N up (2 up, 4 up, 8 up) processing etc.

As the input device identification information, there is employed information capable of uniquely identifying the sheet input device which sends data of copy job to the sheet output device.

A terminal name may be applied to the scanner apparatus 6 by using the domain name service (DNS), for example, normally used in the internet at present as the input device identification information.

The cooperation control portion 644 controls the image read control portion 642 in accordance with the user's operation accepted by the UI control portion 640 to generate the image data and transmit the image data thus generated to the printer apparatus 2.

The cooperation control portion 644 communicates with the printer apparatus 2 through the communication control portion 646 and the network 10 (FIG. 5) in accordance with the user's operation accepted by the UI control portion 640 to perform cooperation processing for printing out the image data at the printer apparatus 2.

[Communication Control Portion 646]

The communication control portion 646 transmits the various kinds of information inputted from the cooperation control portion 644 and the image data inputted from the image read control portion 642 to the network 10.

The communication control portion 646 also transmits a signal necessary for the cooperating operation between the printer apparatus 2 and the scanner apparatus 6, between the cooperation control portion 644 and the printer apparatus 2 through the network 10.

[Print Control Program 50]

Figure 11:
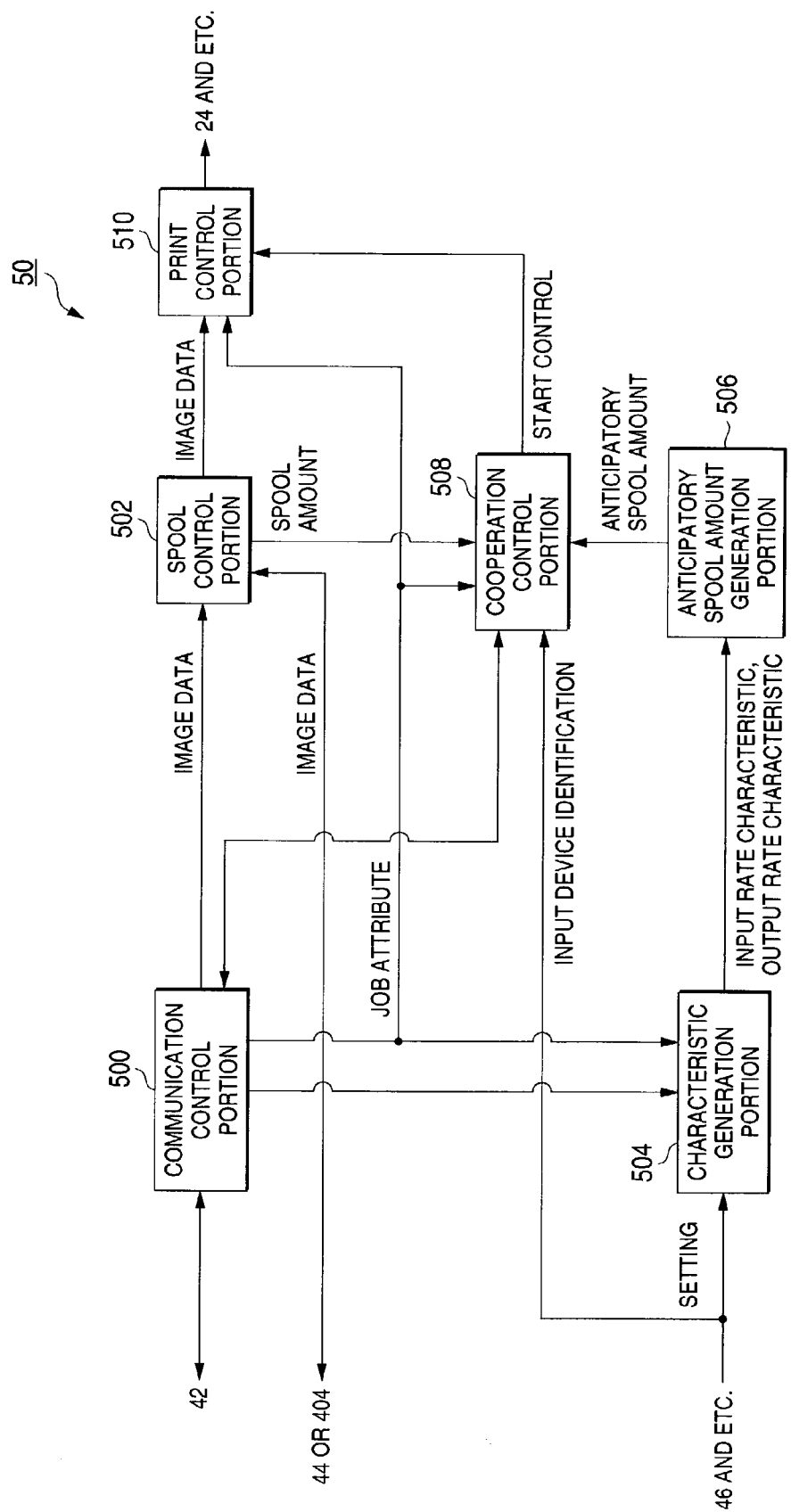
FIG. 11 shows a diagram showing the configuration of a first print control program executed by the control device (FIG. 7) of the printer apparatus.

FIG. 11 is a diagram showing the configuration of the first print control program 50 executed by the control device 4 (FIG. 7) of the printer apparatus 2.

As shown in FIG. 11, the first print control program 50 is configured by a communication control portion 500, a spool control portion 502, a characteristic generation portion 504, an anticipatory spool amount generation portion 506, a cooperation control portion 508 and a print control portion 510.

These constituent portions of the first print control program 50 cooperates with the scanner apparatus 6 to spool the image data transmitted from the scanner apparatus 6 (printer function 2).

Further, the first print control program 50 controls the printer engine 24 (FIG. 6) etc. of the printer apparatus 2 to print out the image data thus spooled (printer function 1).

Furthermore, the first print control program 50 prepares job attribute information used for obtaining the output rate of the printer apparatus 2, calculates the anticipatory spool amount based on the prepared job attribute information of the printer apparatus 2, the job attribute information (table 1) received from the scanner apparatus 6 and the input device identification information, and adjusts timing for printing out the spooled image data based on the anticipatory spool amount thus calculated (printer function 2).

[Communication Control Portion 500]

The communication control portion 500 receives the various kinds of information transmitted from the scanner apparatus 6 and outputs the information to the print control portion 510 and the characteristic generation portion 504.

Further, the communication control portion 500 receives the image data transmitted from the scanner apparatus 6 and outputs the received data to the spool control portion 502.

Furthermore, the communication control portion 500 transmits a signal necessary for the cooperation operation between the printer apparatus 2 and the scanner apparatus 6, between the cooperation control portion 508 and the scanner apparatus 6 through the network 10.

[Spool Control Portion 502]

The spool control portion 502 spools the image data inputted from the communication control portion 500 to the memory 404 or the recording device 44 (FIG. 7) of the printer apparatus 2.

Further, the spool control portion 502 sequentially notifies data amounts (the unit thereof is same as the anticipatory spool amount) of the image data thus spooled to the cooperation control portion 508.

Further, the spool control portion 502 outputs the spooled image data to the print control portion 510 at the time of printing out the image data.

Furthermore, in the aforesaid type in which data is printed out in the face-up manner, the spool control portion 502 performs such a processing necessary for the printing out that the spooled image data is sequentially read in the reverse order from the last page to the first page and supplied to the print control portion 510.

[Characteristic Generation Portion 504]

The characteristic generation portion 504 generates the jog attribute of the printer apparatus 2 based on the user's operation etc. with respect to the display and input device 46.

In this respect, the job attribute of the printer apparatus 2 generated by the characteristic generation portion 504 includes information exemplarily shown in the following table 2, for example.

[Table 2: Job Attribute of the Printer Apparatus 2]

Presence or non-presence of sorter (document sorting or classification), and use or non-use of the sorter.

Output order of sheets (from top page or from last page)

Presence or non-presence of both sides output function and use or non-use of the function.

Sheet size of document (A6, A5, A4, A3, B6, B5, B4, letter, post card etc.), and output direction of the document (longitudinal direction, transversal direction).

Resolution of output (200 dpi (dots per inch), 300 dpi, 400 dpi, 600 dpi etc.) and gradation number (black and white 1 bpp (bits per pixel), gray 8 bpp, color 24 bpp etc.)

Kinds of document (photograph, graphics, characters, mixture etc.).

Output device side image processing, expansion/reduction, N up(2 up, 4 up, 8 up) processing etc.

The characteristic generation portion 504 generates input rate characteristic information representing the input rate of the input device identification information sent from the printer apparatus 2 and the input rate of the image data to the spool control portion 502 from the scanner apparatus 6.

Further, the characteristic generation portion 504 generates output rate characteristic information representing the output rate of the printer apparatus 2 from the job attribute (the table 2) of the printer apparatus 2.

The characteristic generation portion 504 outputs the input rate characteristic information and the output rate characteristic information thus generated to the anticipatory spool amount generation portion 506.

FIG. 12 is a diagram showing an example of a table used for generating the input rate characteristic information by the characteristic generation portion 504 came shown in FIG. 11.

FIG. 13 is a diagram showing an example of a table used for generating the output rate characteristic information by the characteristic generation portion 504 shown in FIG. 11.

The characteristic generation portion 504 generates the input rate characteristic information by referring to the input rate characteristic generation table as exemplarily shown in FIG. 12 which makes each of the combinations of the kind and the job attribute (the table 1) of the scanner apparatus 6, for example, correspond to the input rate characteristic actually measured as to the scanner apparatus 6 in advance in each of the combinations.

Further, the characteristic generation portion 504 generates the output rate characteristic information by referring to the output rate characteristic generation table as exemplarily shown in FIG. 13 which makes each of the combinations of the kind and the job attribute (the table 2) of the printer apparatus 2, for example, correspond to the output rate characteristic actually measured as to the printer apparatus 2 in advance in each of the combinations.

The respective tables (FIGS. 12 and 13) used for generating the input rate characteristic information and the output rate characteristic information are set at the characteristic generation portion 504 through the display and input device 46 or through the recording medium 440 and the recording device 44, for example.

Incidentally, the input rate characteristic holding number in the table shown in FIG. 12 is used at the time of updating a table described later in the second embodiment.

[First Input Rate Characteristic Information]

Figure 14:
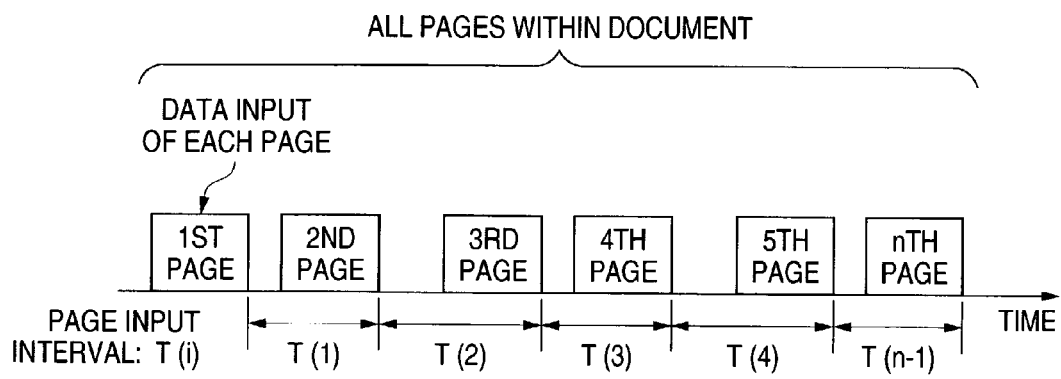
FIG. 14 shows a first diagram for explaining the input rate characteristic information and also represents a page input interval.

FIG. 14 is the first diagram for explaining the input rate characteristic information and also represents a page input interval.

As the first method of obtaining the input rate characteristic information, the first method can be raised which uses an average value and standard deviation of page numbers per unit time of the sheets which are inputted to the printer apparatus 2 and spooled during the unit time period.

In the first method, the input rate characteristic information is defined as shown in the following items (1) to (3).
(1) As shown in FIG. 14, as to each page from the second page to the last page of a unity of the document, a time interval from the completion of the spool of the image data of a preceding page to the completion of the spool of the image data of the current page is defined as "a page input interval".
(2) The reciprocal of the page input interval is defined as "a page input rate".
(3) The average value of the page input rates of a unity of the document is defined as "a page input rate average", standard deviation of the page input rates is defined as "page input rate standard deviation", and these average and the standard deviation are defined as the input rate characteristic information.

[Second Input Rate Characteristic Information]

As the second method of obtaining the input rate characteristic information, the second method can be raised which uses the average value and the standard deviation of the page input interval.

In the second method, the input rate characteristic information is defined as shown in the following items (4) and (5).
(4) As to each page from the second page to the last page of a unity of the document, a time interval from the completion of the spool of the image data of a preceding page to the completion of the spool of the image data of the current page is defined as "a page input interval" (same as the aforesaid item (1)).
(5) The average value of the page input intervals of a unity of the document is defined as "a page input interval average", standard deviation of the page input intervals is defined as "page input interval standard deviation", and these average and the standard deviation are defined as the input rate characteristic information.

[Third Input Rate Characteristic Information]

Figure 15:
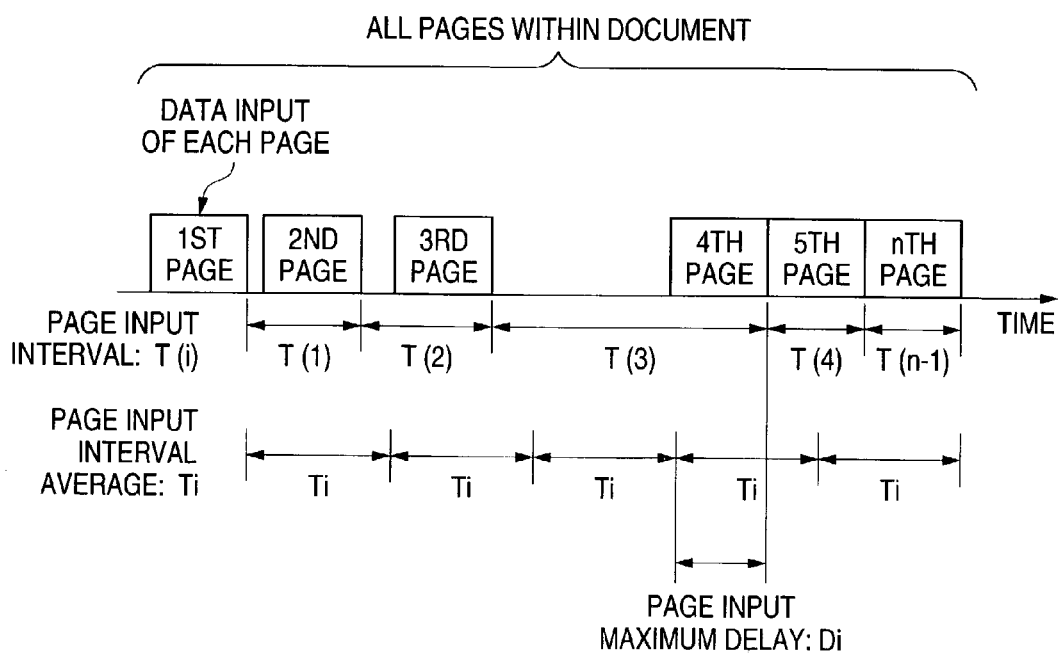
FIG. 15 shows a first diagram for explaining the input rate characteristic information and also represents the input rate characteristic information taking a transient operation and bursty characteristics into consideration.

FIG. 15 is the first diagram for explaining the input rate characteristic information and also represents the input rate characteristic information taking a transient operation and bursty characteristics into consideration.

Further, as the second method of obtaining the input rate characteristic information, the third method using parameter shown in FIG. 15 can be raised.

In the third method, the input rate characteristic information is defined as shown in the following items (6) to (8).
(6) A time interval from the completion of the spool of the image data of a preceding page to the completion of the spool of the image data of the current page is defined as "a page input interval" (same as the aforesaid items (1) and (4)).
(7) The average of the page input intervals is defined as a page input interval average $T_i$.
(8) The maximum value of the delay of the accumulation of the page input intervals with respect to the accumulation of the page input interval average shown in the following expression (1) is defined as a page input maximum delay $D_i$.

In the following explanation, a concrete example is explained as to the case where the input rate characteristic information obtained from the third method is employed.

$$\Sigma_{i=1 \ldots k} T(i) - kT_i \qquad (1)$$

where k=1, 2, - - -, n−1.

[First Output Rate Characteristic Information]

Figure 16:
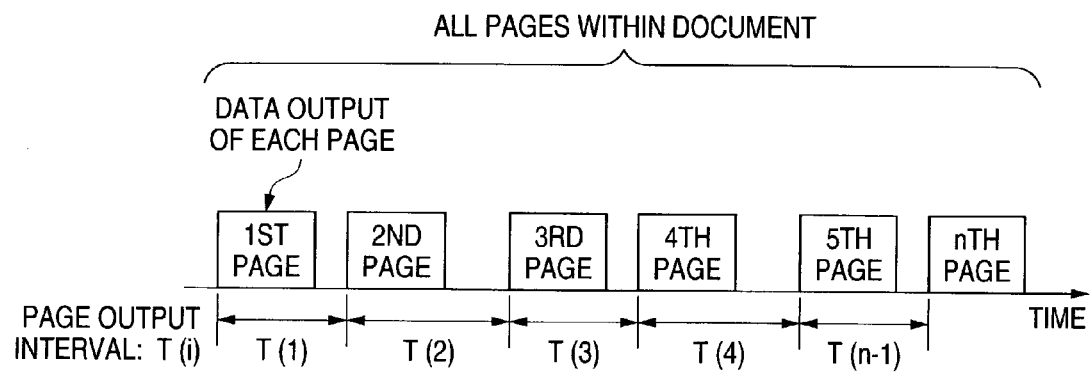
FIG. 16 shows a first diagram for explaining the output rate characteristic information and also represents a page output interval.

FIG. 16 is the first diagram for explaining the output rate characteristic information and also represents a page output interval.

As the method of obtaining the output rate characteristic information, the first method can be raised which uses an average value and standard deviation of page numbers per unit time of the sheets which are started to be printed out by the printer engine 24 (FIG. 6) of the printer apparatus 2 during the unit time period.

In the first method, the output rate characteristic information is defined in the following items (1) to (3).
(1) As shown in FIG. 16, as to each page from the first page to the penultimate page of the document, a time interval from the start of the printing-out of the image data of a current page to the start of the printing-out of the image data of the next page is defined as "a page output interval".
(2) The reciprocal of the page output interval is defined as "a page output rate".
(3) The average value of the page output rates of a unity of the document is defined as "a page output rate average", standard deviation of the page output rates is defined as "page output rate standard deviation", and these average and the standard deviation are defined as the output rate characteristic information.

[Second Input Rate Characteristic Information]

As the second method of obtaining the input rate characteristic information, the second method can be raised which uses the average value and the standard deviation of the page input interval.

In this case, the output rate characteristic information is defined by the following items (4) and (5).
(4) As to each page from the first page to the penultimate page of a unity of the document, a time interval from the start of the printing-out of the image data of a current page to the start of the printing-out of the image data of the next page is defined as "a page output interval". (same as the aforesaid item (1)).
(5) The average value of the page output intervals of a unity of the document is defined as "a page output interval average", standard deviation of the page output intervals is defined as "page output interval standard deviation", and these average and the standard deviation are defined as the output rate characteristic information.

[Third Input Rate Characteristic Information]

Figure 17:
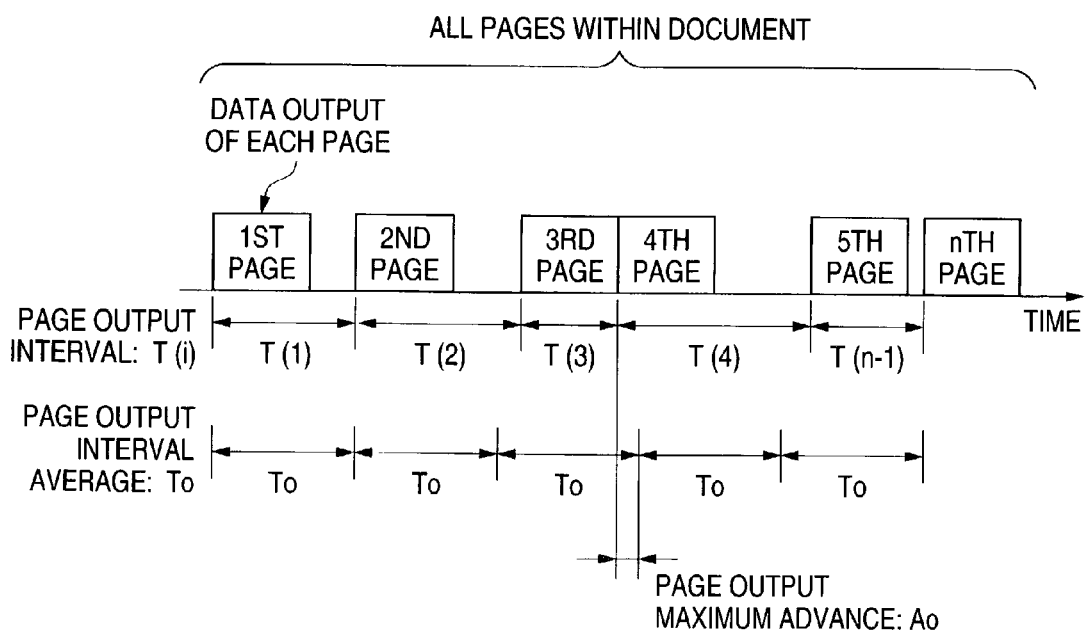
FIG. 17 shows a second diagram for explaining the output rate characteristic information and also represents the output rate characteristic information taking bursty characteristics into consideration.

FIG. 17 is the second diagram for explaining the output rate characteristic information and also represents the output rate characteristic information taking bursty characteristics into consideration.

Further, as the third method of obtaining the output rate characteristic information, a method using parameter shown in FIG. 17 taking the bursty characteristics into consideration can be raised.

In the third method, the output rate characteristic information is defined as shown in the following items (6) to (8).
(6) As to each page from the first page to the penultimate page of a unity of the document, a time interval from the start of the printing-out of the image data of a current page to the start of the printing-out of the image data of the next page is defined as "a page output interval". (same as the aforesaid items (1) and (4)).
(7) The average of the page output intervals is defined as a page output interval average $T_o$.
(8) The maximum value of the advance of the accumulation of the page output intervals with respect to the accumulation of the page output interval average shown in the following expression (2) is defined as a page output maximum advance Ao.

In the following explanation, a concrete example is explained as to the case where the output rate characteristic information obtained from the third method is employed.

$$kT=\Sigma_{i=1...k}T(i) \qquad (2)$$

where k=1, - - -, n-1.

[Anticipatory Spool Amount Generation Portion 506]

The anticipatory spool amount generation portion 506 calculates an anticipatory spool amount from the input rate characteristic information and the output rate characteristic information inputted from the characteristic generation portion 504 and outputs the anticipatory spool amount thus calculated to the cooperation control portion 508.

[Method of Obtaining an Anticipatory Spool Amount]

The method of generating an anticipatory spool amount by the anticipatory spool amount generation portion 506 will be further explained.

Figure 18:
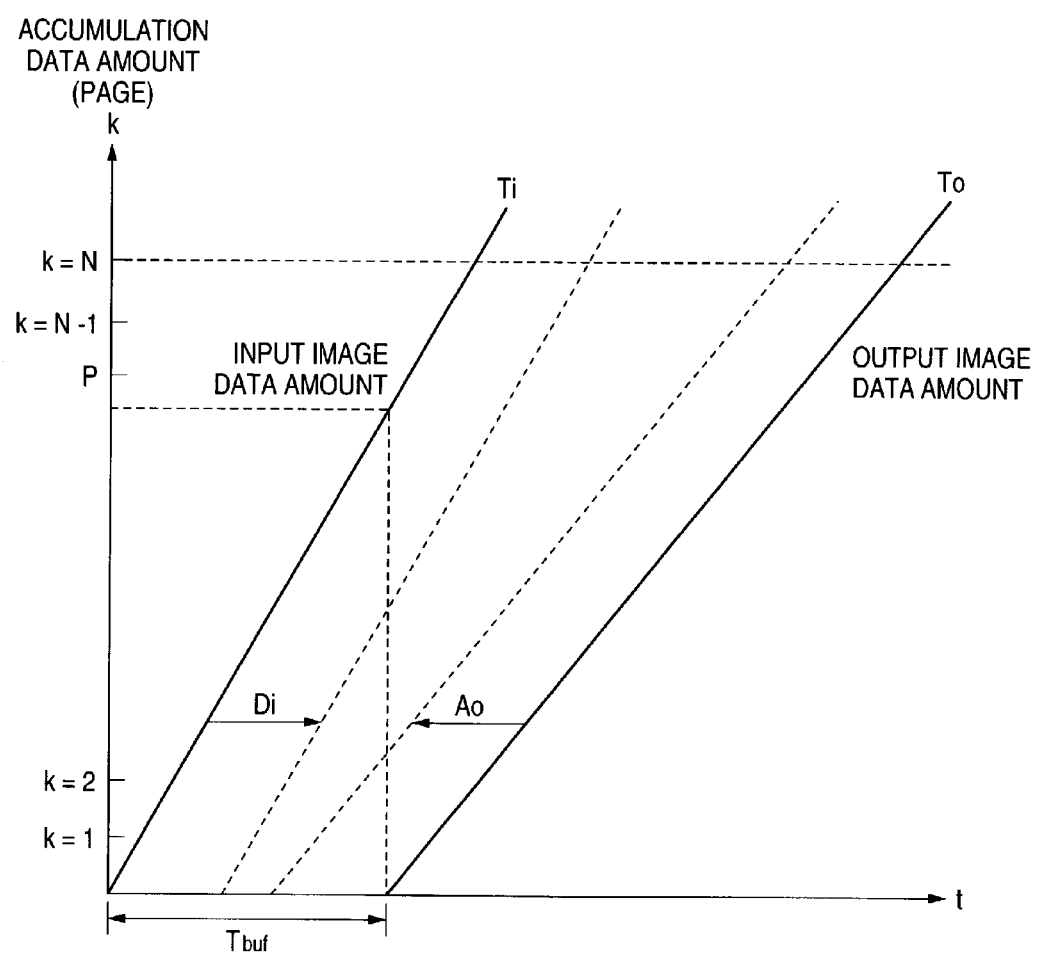
FIG. 18 shows a diagram showing the method of calculating the anticipatory spool amount at an anticipatory spool amount generation portion

FIG. 18 is a diagram showing the method of calculating the anticipatory spool amount at the anticipatory spool amount generation portion 506.

Although each of the input image data amount and the output image data amount changes stepwise actually as shown in FIG. 4 since the image data is transmitted on page unit basis between the printer apparatus 2 and the scanner apparatus 6, changes of each of the input image data amount and the output image data amount is represented linearly in FIG. 18 so as to simplify the drawings.

In the case where the characteristic generation portion 504 generates an input rate value (the input rate characteristic information) representing that a time required for inputting image data of one page is Ti (for example, Ti=a page input rate average; FIG. 15) and also generates an output rate value (the output rate characteristic information) representing that a time required for printing out image data of one page is To (for example, To=a page output rate average; FIG. 17), an accumulation data value of the input image data and an accumulation data value of the print-out image data are estimated to change as shown by a steady line in FIG. 18.

In this respect, when it is known in advance that there are possibilities that the input rate may delay by Di at the maximum (maximum delay Di; FIG. 15) and the print-out operation may advance by Ao at the maximum (maximum advance Ao; FIG. 17), the input image data and the output image data may change at worst as shown by dot lines in FIG. 18 when taking the aforesaid possibilities into consideration.

The difference between the two dot lines shown in FIG. 18 corresponds to an amount of the image data to be spooled at each timing by the spool control portion 502 of the printer apparatus 2 under the worst condition.

As will be understood easily, when the dot lines shown in FIG. 18 are overlapped, underflowing of the image data may occur in the printer apparatus 2 at worst.

Thus, when the anticipatory spool amount is set to the minimum value not overlapping the dot lines shown in FIG. 18, the working rate or the operating efficiency of the printer apparatus 2 can be made maximum while guaranteeing that over-flow does not occur.

The condition where the two dot lines shown in FIG. 18 do not overlap is showin in the following expression (3).

$$kTo-Ao+Tbuf>kTi+Di \qquad (3)$$

Thus, the range of time Tbuf during which the image data is to be subjected to the anticipatory spooling is obtained by the following expression (4) and the minimum value Tmin of the time Tbuf is obtained from the following expression (5).

$$Tbuf>k(Ti-To)+Di+Ao \qquad (4)$$

$$Tmin=k(Ti-To)+Di+Ao \qquad (5)$$

In this respect, since the image data is inputted and outputted on page unit basis, an amount P (anticipatory spool amount; unit is page) of the image data to be spooled by the spool control portion 502 in the printer apparatus 2 can be obtained by the following expression (6).

In this respect, although the anticipatory spool amount is set as page unit basis, the anticipatory spool amount can be obtained as data amount or time unit basis.

$$P=[(Tmin+Ti)/Ti] \qquad (6)$$

Where [x] represents an integer equal to or smaller than x.

[Cooperation Control Portion 508]

The cooperation control portion 508 compares an anticipatory spool amount inputted from the anticipatory spool amount generation portion 506 and a spool amount inputted from the spool control portion 502, and performs the start control for the print control portion 510 to start the printing processing when the image data amount spooled by the spool control portion 502 reaches the anticipatory spool amount.

Further, the cooperation control portion 508 communicates with the scanner apparatus 6 through the god potion 500 and the network 10 (FIG. 5) in accordance with the user's operation with respect to the display and input device 46 thereby to perform the cooperation processing for printing the image data in the printer apparatus 2.

[Print Control Portion 510]

The print control portion 510 reads the spooled image data and starts the printing of the image data thus read in accordance with the start control of the cooperation control portion 508.

After the image data is read and the printing of the image data is started, the print control portion 510 sequentially reads the image data spooled at the spool control portion 502 and controls the printer engine 24 etc. (FIG. 6) of the printer apparatus 2 thereby to make the read image data print out sequentially.

[Operation of Network System 1]

Hereinafter, explanation will be made as to the operation of the network system 1 in the first embodiment.

Figure 19:
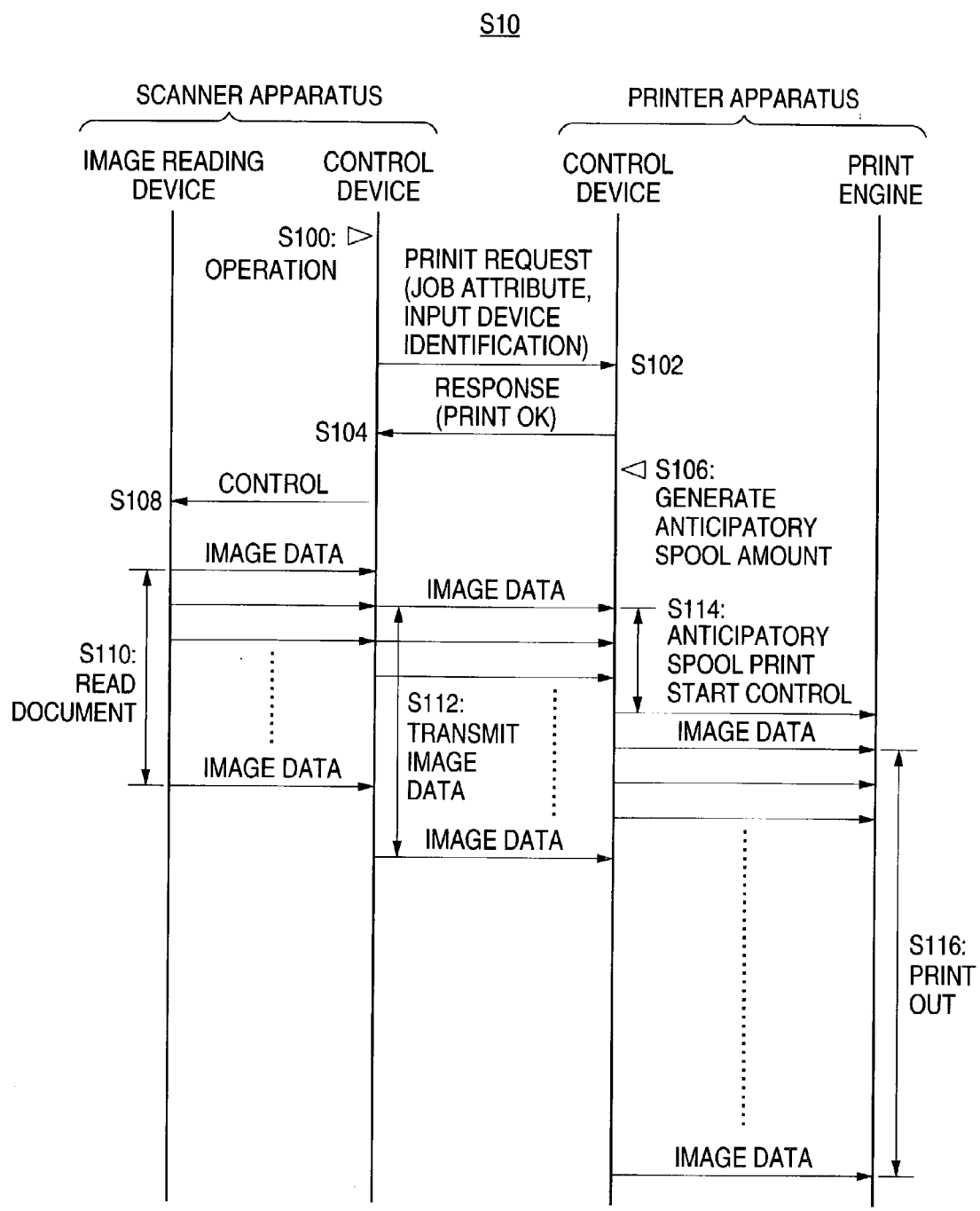
FIG. 19 shows a sequence diagram showing the operations (S10) of the scanner apparatus and the printer apparatus in the network system in the first embodiment.

FIG. 19 is a sequence diagram showing the operations (S10) of the scanner apparatus 6 and the printer apparatus 2 in the network system 1 in the first embodiment.

As shown in FIG. 19, in step 100 (S100), a user performs an operation as to a UI image displayed at the display and input device 46 (FIG. 9) by the UI control portion 640 (FIG. 10) of the first scanner control program 64, and also performs an operation for printing by the printer apparatus 2 the image data read by the scanner apparatus 6 (S100).

In step 102 (S102), the cooperation control portion 644 generates the job attribute (the table 1) of the scanner apparatus 6 and transmits the print request including the job attribute information thus generated and the input device identification information to the printer apparatus 2 through the communication control portion 646 and the network 10 (FIG. 1).

In step 104 (S104), the cooperation control portion 508 (FIG. 11) sends, in response to the reception of the print request from the scanner apparatus 6, a response indicating that the printing operation is possible to the printer apparatus 2 through the network 10 and the communication control portion 500.

In step 106 (S106), the characteristic generation portion 504 obtains the input rate characteristic information and output rate characteristic information (FIG. 18), and the portion 606 obtains the anticipatory spool amount P as shown in the expressions (3) to (6).

In step 108 (S108) to step 112 (S112), the cooperation control portion 644 controls the image reading device 60 and the document feeding device 62 (FIG. 8) through the image read control portion 642 thereby to feed the document set at the document feeding device 62 to read the image of the document and to generate image data.

The image read control portion 642 fetches the image data thus generated sequentially and transmits the image data thus fetched to the printer apparatus 2 through the communication control portion 646 and the network 10.

In step 114 (S114), the spool control portion 502 sequentially spools the image data received from the scanner apparatus 6 into the memory 404 or the recording device 44.

When the data amount of the image data spooled by the spool control portion 502 reaches the anticipatory spool amount P (the expression (6)), the cooperation control portion 508 performs the start control for the print control portion 510 thereby to have the print control portion start the printing processing.

In step 116 (S116), the print control portion 510 controls the printer engine 24 etc. (FIG. 6) thereby to sequentially print out the spooled image data.

[Second Embodiment]

The second embodiment of the image generating method and the image forming method using the anticipatory spooling according to the invention will be explained.

In the second embodiment, the first input rate characteristic information (the page input rate average value, the page input rate standard deviation input value) shown in FIG. 14 and the first output rate characteristic information (the page output rate average value, the page output rate standard deviation input value) shown in FIG. 16 is used.

In the second embodiment, the delivery rate, the input rate and the output rate are actually measured and the input rate characteristic table (FIG. 12) and the output rate characteristic table (FIG. 13) are updated.

Figure 20:
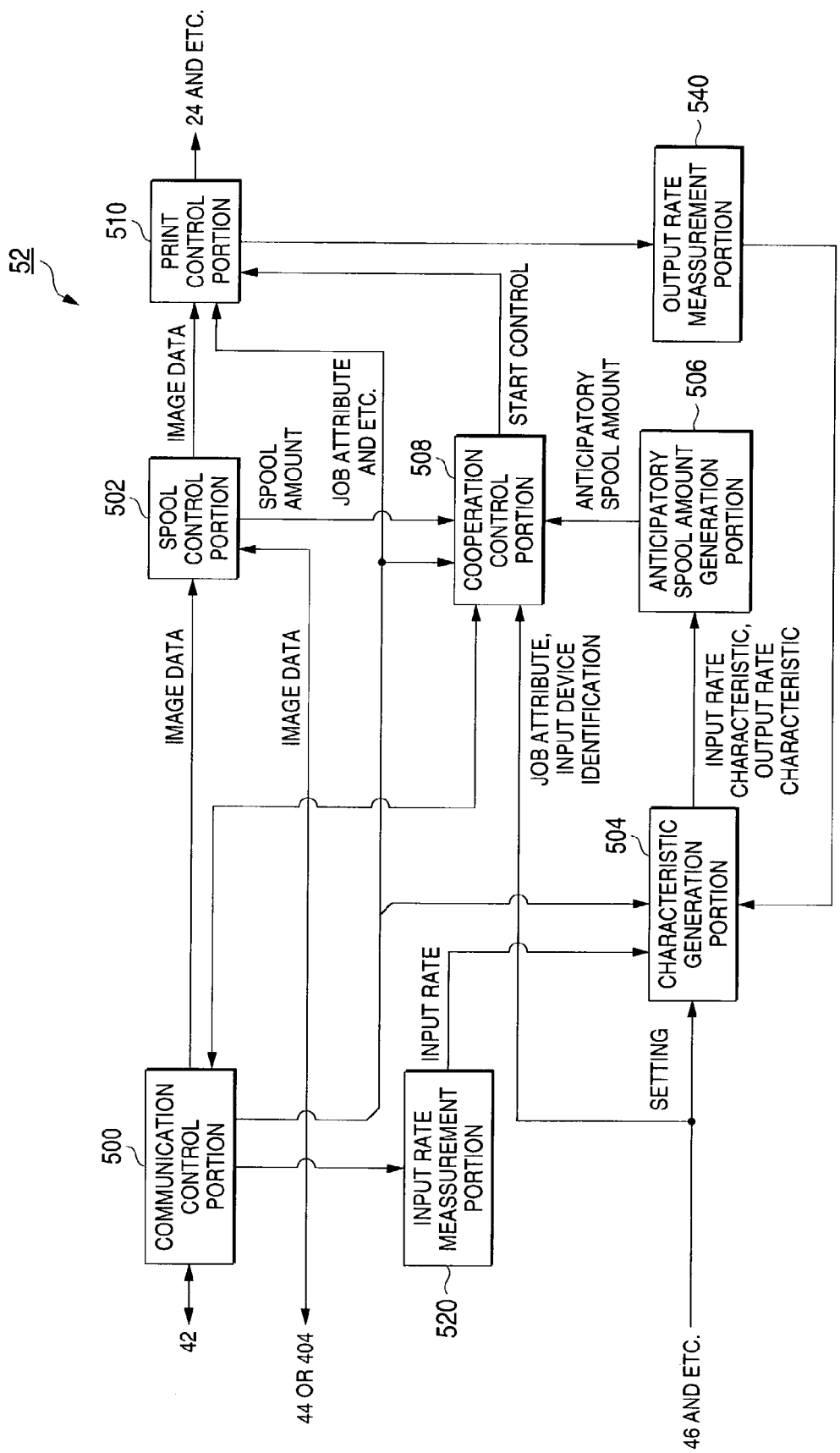
FIG. 20 shows a diagram showing the configuration of second print control program executed by the control device (FIG. 7) of the printer apparatus.

FIG. 20 is a diagram showing the configuration of second print control program 52 executed by the control device 4 (FIG. 7) of the printer apparatus 2.

Incidentally, of the respective constituent portions of the second print control program 52 shown in FIG. 20, the portions which are substantially same as those of the first print control program 50 shown in FIG. 11 are labeled with the same symbols.

FIG. 21 is a diagram showing the configuration of second scanner control program 66 executed by the control device 4 (FIG. 9) of the scanner apparatus 6.

Incidentally, of the respective constituent portions of the second scanner control program 66 shown in FIG. 21, the portions which are substantially same as those of the first scanner control program 64 shown in FIG. 10 are labeled with the same symbols.

The second scanner control program 66 executed by the scanner apparatus 6 is used in the network system 1 together with the second print control program 52 (FIG. 20) executed by the printer apparatus 2.

[Print Control Program 52]

As shown in FIG. 20, the second print control program 52 is configured in a manner that an input rate measuring portion 520 and an output rate measuring portion 540 are added to the first print control program 50 shown in FIG. 11.

By these constituent portions, the second print control program 52 realizes functions similar to those of the first print control program 50, and further realizes functions of measuring the data rate (the input rate; FIG. 3) of the image data sent from the scanner apparatus 6 through the network 10 and the data rate (the output rate; FIG. 3) of the image data printed out by the print control portion 510 and always updating the input rate characteristic table (FIG. 12) and the output rate characteristic table (FIG. 13) of the characteristic generation portion 504 based on these measured results.

Due to the updating function of the tables, the characteristic generation portion 504 generates the input rate characteristic information of the values reflecting the actual input rate and output rate, and the anticipatory spool amount generation portion 506 always obtains a suitable anticipatory spool amount by using the input rate characteristic information and the output rate characteristic information.

The input rate measuring portion 520 measures the input rate with respect to the spool control portion 502 and outputs the measured result to the characteristic generation portion 504.

The output rate measuring portion 540 measures the output rate of the print control portion 510 and outputs the measured result to the characteristic generation portion 504.

[Scanner Control Program 66]

As shown in FIG. 21, the second scanner control program 66 is configured in a manner that a delivery rate measuring portion 660 is added to the first scanner control program 64.

The delivery rate measuring portion 660 measures the data rate (the delivery rate) of the image data which is generated from the image read control portion 642 by reading the document and outputs the measured result to the cooperation control portion 644.

The cooperation control portion 644 transmits the delivery rate inputted from the delivery rate measuring portion 660 to the printer apparatus 2 through the communication control portion 646 and the network 10 together with the input device identification information and the job attribute of the scanner apparatus 6.

[Characteristic Generation Portion 504]

The characteristic generation portion 504 of the print control program 52 (FIG. 20) makes correspondence the measurement result of the input rate inputted from the input rate measuring portion 520 and the measurement result of the delivery rate from the scanner apparatus 6 with the job attribute of the scanner apparatus 6 applying the input rate and the input device identification information thereby to form the input rate characteristic table or update the existing input rate characteristic table.

The characteristic generation portion 504 makes correspondence the measurement result of the output rate inputted from the output rate measuring portion 540 with the job attribute of the scanner apparatus 6 applying the output rate and the input device identification information thereby to form the output rate characteristic table or update the existing output rate characteristic table.

[Anticipatory Spool Amount Generation Portion 506]

As described above, in the second embodiment, since the first input rate characteristic information shown in FIG. 14 and the first output characteristic information shown in FIG. 16 are employed unlike the first embodiment, the anticipatory spool amount generation portion 506 generates the anticipatory spool amount by the method different from that performed by the print control program 50 shown in FIG. 1.

[Updating (1) of Input Rate Characteristic Information Forming Table]

FIG. 22 is a flowchart showing a processing (S12) in which the characteristic generation portion 504 updates the input rate characteristic table (FIG. 12) by using the measuring result of the input rate inputted from the input rate measuring portion 520 in the second print control program 52 shown in FIG. 20.

First, the input rate measuring portion 520 outputs a page input rate average Mnew and a page input rate standard deviation Dnew to the characteristic generation portion 504 as the measuring result of the input rate.

In step 120 (S120), the characteristic generation portion 504 compares the input rate characteristic information holding number Nold of the input rate characteristic table shown in FIG. 12 with a determination threshold value Nthr thereby to check the reliability of the values set at the input rate characteristic table.

The characteristic generation portion 504 determines that the existing setting values are reliable in the case of Nold>Nthr and the process proceeds to step S122. In contrast, in the case of Nold≦Nthr, the process proceeds to step S124.

The input rate characteristic information holding number is the number of input rate characteristic information, which has been stored (learned or programmed). The input rate characteristic information holding number is used as an index indicating credibility of the value of the stored (learned, programmed) input rate characteristic information (how large population of statistic is).

In step 122 (S122), the characteristic generation portion 504 stores a page input rate average value Mold and a page input rate standard deviation Dold held in the input rate characteristic table and outputs these values to the processing of step S180 described later with reference to FIG. 25.

In step 124 (S124), the characteristic generation portion 504 receives the page input rate average Mnew and the page input rate standard deviation Dnew inputted from the input rate measuring portion 520.

In step 126 (S126), the characteristic generation portion 504 determines whether or not Dnew/Mnew is smaller than a coefficient k (0<k<1).

The characteristic generation portion 504 determines that the degree of fluctuation is small in the case of Dnew/Mnew<k and the process proceeds to step S128. In contrast, in the case of Dnew/Mnew≧k, the characteristic generation portion determines that the degree of the fluctuation is large and the process proceeds to step S136 thereby to set 0 to Nold.

In the case where the degree of the fluctuation is determined to be large, the values of Mold and Dnew are made not to be used for the calculation of the anticipatory spool amount by setting the input rate characteristic information holding number Nold to 0.

In step 128 (S128), the characteristic generation portion 504 determines whether or not the input rate characteristic information holding number Nold is larger than 0.

When it is determined that Nold>0, the characteristic generation portion 504 proceeds the processing to a step S130. In contrast, when it is determined that Nold≦0, the process proceeds to step S134.

In step 130 (S130), the characteristic generation portion 504 determines whether or not the absolute value of 1−Mnew/Mold is smaller than the coefficient k.

When it is determined that |1−Mnew/Mold|<k, the characteristic generation portion 504 determines that the degree of variation is small and proceeds the processing to step S132. In contrast, when it is determined that |1−Mnew/Mold|≧k, the process proceeds to step S136.

In step 132 (S132), the characteristic generation portion 504 calculates weighted averages of Mold, Dold and Mnew, Dnew as shown in the following expressions (7-1) to (7-3) thereby to update the page input rate average value Mold and the page input rate standard deviation Dold of the input rate characteristic table.

Further, the characteristic generation portion 504 increments Nold.

$$M\text{old} = (M\text{old} \cdot N\text{old} + M\text{new})/(N\text{old}+1) \quad (7\text{-}1)$$

$$D\text{old} = (D\text{old} \cdot N\text{old} + D\text{new})/(N\text{old}+1) \quad (7\text{-}2)$$

$$N\text{old} = N\text{old}+1 \quad (7\text{-}3)$$

In step 134 (S134), the characteristic generation portion 504 rewrites Mold by Mnew and also rewrites Dold by Dnew and sets Nold to 1.

In this respect, the processing of step S134 is executed when the processing of S12 is performed for the first time and also immediately after Nold is set to 0.

[Updating of Output Rate Characteristic Information Forming Table]

Figure 23:
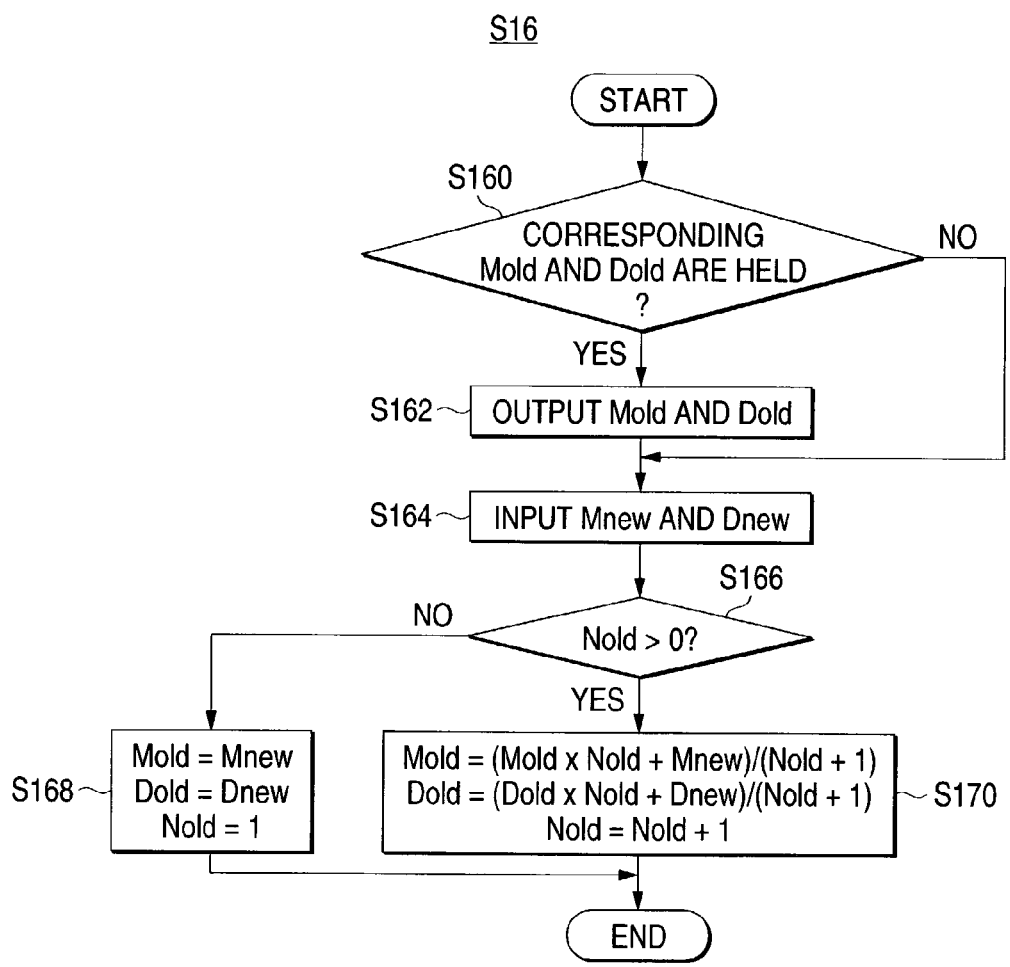
FIG. 23 shows a flowchart showing a processing (S16) in which the characteristic generation portion updates an output rate characteristic table (FIG. 13) by using the measuring result of the output rate inputted from an output rate measuring portion in the second print control program shown in FIG. 20.

FIG. 23 is a flowchart showing a processing (S16) in which the characteristic generation portion 504 updates the output rate characteristic table (FIG. 13) by using the measuring result of the output rate inputted from the output rate measuring portion 540 in the second print control program 52 shown in FIG. 20.

First, the output rate measuring portion 540 outputs a page output rate average Mnew and a page output rate standard deviation Dnew to the characteristic generation portion 504 as the measuring result of the output rate.

In step 160 (S160), the characteristic generation portion 504 determines whether or not the page output rate average value Mold and the page output rate standard deviation Dold corresponding to the measuring result of the output rate inputted from the output rate measuring portion 540 are held in the output rate characteristic table.

When it is determined as being held, the characteristic generation portion 504 proceeds the processing to step S162, in contrast the characteristic generation portion proceeds the processing to step S164 when it is determined as not being held.

In step 162 (S162), the characteristic generation portion 504 stores a page output rate average value Mold and a page output rate standard deviation Dold held in the output rate characteristic table and outputs these values to the processing of step S182 described later with reference to FIG. 25.

In step 164 (S164), the characteristic generation portion 504 receives the page output rate average Mnew and the page output rate standard deviation Dnew inputted from the output rate measuring portion 540.

In step 166 (S166), the characteristic generation portion 504 determines whether or not the input rate characteristic information holding number Nold is larger than 0.

When it is determined that Nold>0, the characteristic generation portion 504 proceeds the processing to a step S170. In contrast, when it is determined that Nold≦0, the process proceeds to step S168.

In step 134 (S134), the characteristic generation portion 504 rewrites Mold by Mnew and also rewrites Dold by Dnew and sets Nold to 1.

In this respect, since the processing of step S16 is performed on the assumption that the output rate does not vary largely, the processing of setting Nold to 0 is not its contained.

Thus, the processing of step S168 is executed only when the processing of S16 is performed for the first time.

In step 170 (S170), the characteristic generation portion 504 updates the page output rate average value Mold and the page output rate standard deviation Dold of the output rate characteristic table as shown in the expressions (7-1) to (7-3) and increments Nold.

[Updating (2) of Input Rate Characteristic Information Forming Table]

FIG. 24 is a flowchart showing a processing (S14) in which the characteristic generation portion 504 updates the input rate characteristic table (FIG. 12) by using the measuring result of the delivery rate received from the scanner control program 66 (FIG. 21) and the measuring result of the input rate generated by the input rate measuring portion 520.

In the scanner apparatus 6, the delivery rate measuring portion 660 measures the delivery rate and outputs a page delivery rate average Morig and page delivery rate standard deviation Dorig as the measuring result.

The cooperation control portion 644 transmits these values to the printer apparatus 2, and these values are inputted into the characteristic generation portion 504 of the print control program 52 within the printer apparatus 2.

In step 140 (S140), the characteristic generation portion 504 compares the input rate characteristic information holding number Nold of the input rate characteristic table shown in FIG. 12 with the determination threshold value Nthr thereby to check the reliability of the values set at the input rate characteristic table.

The characteristic generation portion 504 determines that the existing setting values are reliable in the case of Nold>Nthr and the process proceeds to step S42. In contrast, in the case of Nold≦Nthr, the process proceeds to step S144.

In step 142 (S142), the characteristic generation portion 504 holds the page input rate average value Mold and the page input rate standard deviation Dold held in the input rate characteristic table and outputs these values to the processing of step S180 described later with reference to FIG. 25.

In step 144 (S144), the characteristic generation portion 504 receives the page input rate average Mnew and the page input rate standard deviation Dnew inputted from the input rate measuring portion 520 and the page delivery rate average value Morig and the page delivery rate standard deviation Dorig generated by the delivery rate measuring portion 660.

In step 146 (S146), the characteristic generation portion 504 determines whether or not the absolute value of 1−Mnew/Morig is smaller than the coefficient k.

The characteristic generation portion 504 determines that the degree of fluctuation is small in the case of |1−Mnew/Morig|<k and the process proceeds to step S148. In contrast, in the case of |1−Mnew/Morig|≧k, the characteristic generation portion determines that the degree of the fluctuation is large and the process proceeds to step S158 thereby to set 0 to Nold.

In the case where the degree of the fluctuation is determined to be large, the characteristic generation portion 504 sets the input rate characteristic information holding number Nold to 0 thereby to make the values of Mold and Dnew not be used for the calculation of the anticipatory spool amount.

In step 148 (S148), the characteristic generation portion 504 determines whether or not the absolute value of 1−Dnew/Dorig is smaller than the coefficient k.

When it is determined that |1−Dnew/Dorig|<k, the characteristic generation portion 504 determines that the degree of fluctuation is small and proceeds the processing to step S150. In contrast, when it is determined that |1−Dnew/Dorig|≧k, the characteristic generation portion determines that the degree of fluctuation is large and the process proceeds to step S158.

In step 150 (S150), the characteristic generation portion 504 determines whether or not Nold is larger than 0.

When it is determined that Nold>0, the characteristic generation portion 504 determines that the degree of variation is small and proceeds the processing to a step S152. In contrast, when it is determined that Nold≦0, the process proceeds to step S156.

In step 152 (S152), the characteristic generation portion 504 determines whether or not the absolute value of 1−Mnew/Mold is smaller than the coefficient k.

When it is determined that |1−Mnew/Mold|<k, the characteristic generation portion 504 determines that the degree of fluctuation is small and proceeds the processing to step S154. In contrast, when it is determined that |1−Mnew/Mold|≧k, the characteristic generation portion determines that the degree of fluctuation is large and the process proceeds to step S158.

In step 154 (S154), the characteristic generation portion 504 updates the page input rate average value Mold and the page input rate standard deviation Dold of the input rate characteristic table as shown in the expressions (7-1) to (7-3) and increments Nold.

In step 156 (S156), the characteristic generation portion 504 rewrites Mold by Mnew and also rewrites Dold by Dnew and sets Nold to 1.

Figure 25:
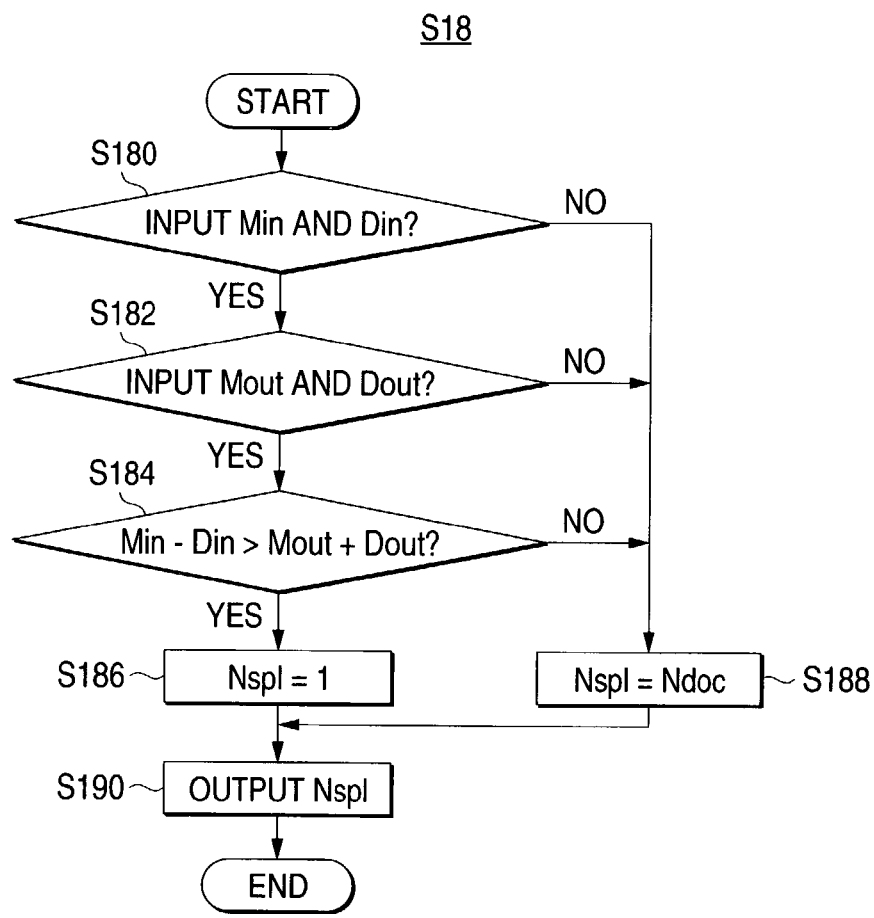
FIG. 25 shows a flowchart showing a processing (S18) in which an anticipatory spool amount generation portion obtains an anticipatory spool amount.

FIG. 25 is a flowchart showing a processing (S18) in which the anticipatory spool amount generation portion 506 obtains an anticipatory spool amount.

As shown in FIG. 25, in step 180 (S180), the anticipatory spool amount generation portion 506 determines whether or not an associated page input rate average input value Min and an associated page input rate standard deviation input value Din are inputted into the input rate characteristic table (FIG. 12).

When it is determined that these values are not inputted, the print control program 52 proceeds the processing to step S188. In contrast, when it is determined no, the process proceeds to step S182.

In step 182 (S182), the anticipatory spool amount generation portion 506 determines whether or not an associated page output rate average input value Mout and an associated page output rate standard deviation input value Dout are inputted into the output rate characteristic table (FIG. 13).

When it is determined that these values are not inputted, the print control program 52 proceeds the processing to step S188. In contrast, when it is determined no, the process proceeds to step S184.

Figure 26:
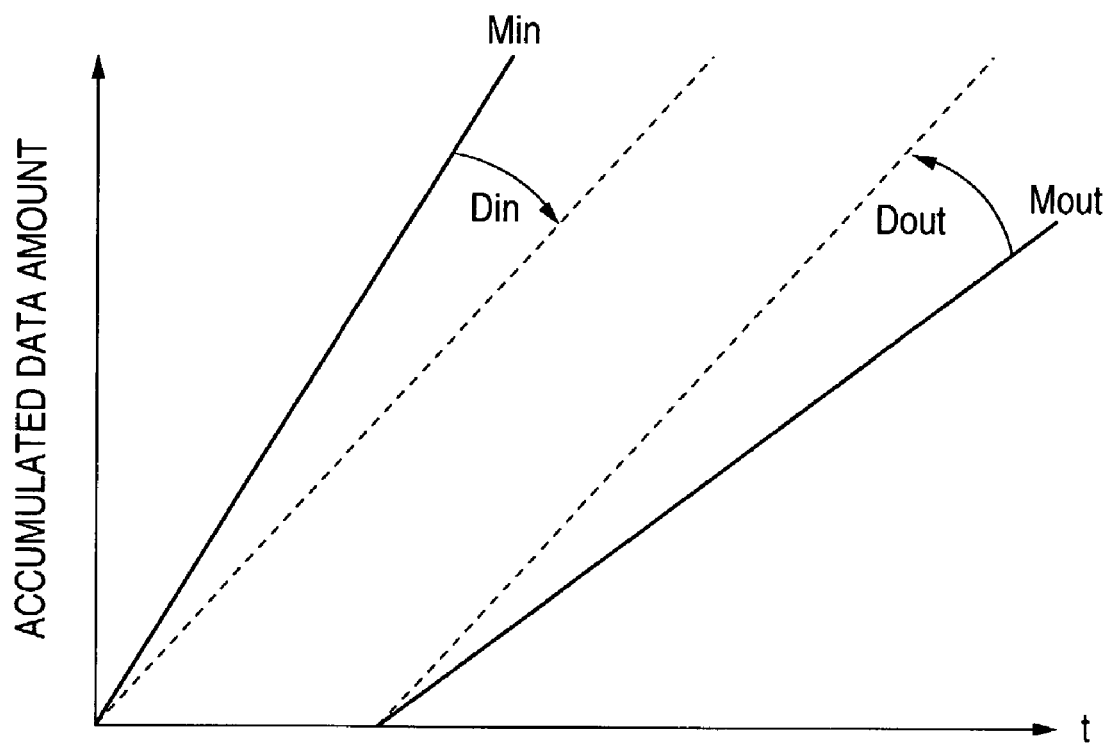
FIG. 26 shows a diagram explaining the processing of step S184 shown in FIG. 25.

FIG. 26 is a diagram explaining the processing of step S184 shown in FIG. 25.

In step 184 (S184), the anticipatory spool amount generation portion 506 determines whether or not Min−Din is larger than Mout+Dout.

When it is determined that Min−Din is not larger than Mout+Dout, the print control program 52 proceeds the processing to step S188. In contrast, when it is determined yes, the process proceeds to step S186.

As shown in FIG. 26, Min represents inclination of the accumulation value of the input image data amounts, Mout represents inclination of the accumulation value of the output image data amounts, Din represents the changeable degree where the inclination angle of the accumulation value of the input image data amounts may be smaller, and Dout represents the changeable degree where the inclination angle of the accumulation value of the output image data amounts may be larger.

Thus, the anticipatory spool amount can be made one page within a range where the accumulation value of the input image data amounts shown by a dot line obtained by subtracting Din from Min and the accumulation value of the output image data amounts shown by another dot line obtained by adding Dout to Mout do not cross to each other.

In this embodiment, except for the case where the anticipatory spool amount is made one page, the anticipatory spool amount is set as all pages of a unity of document.

Incidentally, when the anticipatory spool amount is obtained so that the two dot liens do not cross to each other until the printing of all pages is completed by taking the page number of the document into consideration, the anticipatory spool amount can be set to an optimum value equal to or less than all pages of the document.

In step 186 (S186), the anticipatory spool amount generation portion 506 sets the page number of the anticipatory spool amount Nspl to 1.

In step 188 (S188), the anticipatory spool amount generation portion 506 sets the page number of the anticipatory spool amount Nspl to the page number of the unity of the document.

In step 190 (S190), the anticipatory spool amount generation portion 506 outputs the value of Nspl.

In the case of estimating the effect of the invention quantitatively, supposing that the delivery rate from the sheet input device is 30 ppm, the transfer throughput of the inter device network is 30 ppm, the page number within the document is 100 pages/doc and the number of the transient bursty output is 2 pages, the output start delay of the conventional technique and the output start delay according to the invention are represented by the following expressions (8-1), (8-2), respectively.

[Output Start Delay of the Conventional Technique; 8-1] =page number within the document/MIN (delivery rate, network throughput)=200 sec.

[Output start delay according to the invention; 8-2]=number of transient bursty output/MIN (delivery rate, network throughput)=4 sec.

As shown above, according to the anticipatory spooling of the invention, in particular under the circumstance that the input rate to the spool is hardly influenced by the transfer throughput of the inter device network such as copy jobs between the input and output devices occurring locally in the office which may be most of the network distributed copy jobs, it is expected that the output start delay of the copy job of the document consisting of many pages will be shortened.

[Modification Example]

Hereinafter, a modification example of the image generating method and the image forming method using the anticipatory spooling according to the invention will be explained.

In the case of using other information as the measuring result of the input rate, the input rate characteristic table can be updated by suitably modifying the processing shown in FIG. 22.

Also, in the case of using other information as the measuring result of the output rate, the output rate characteristic table can be updated by suitably modifying the processing shown in FIG. 23.

Also, in the case of using the page input interval average and the page input average standard deviation as the input rate characteristic information and also using the page output interval average and the page output average standard deviation as the output rate characteristic information, the anticipatory spool amount can be obtained by suitably modifying the processing shown in FIG. 25.

Figure 27:
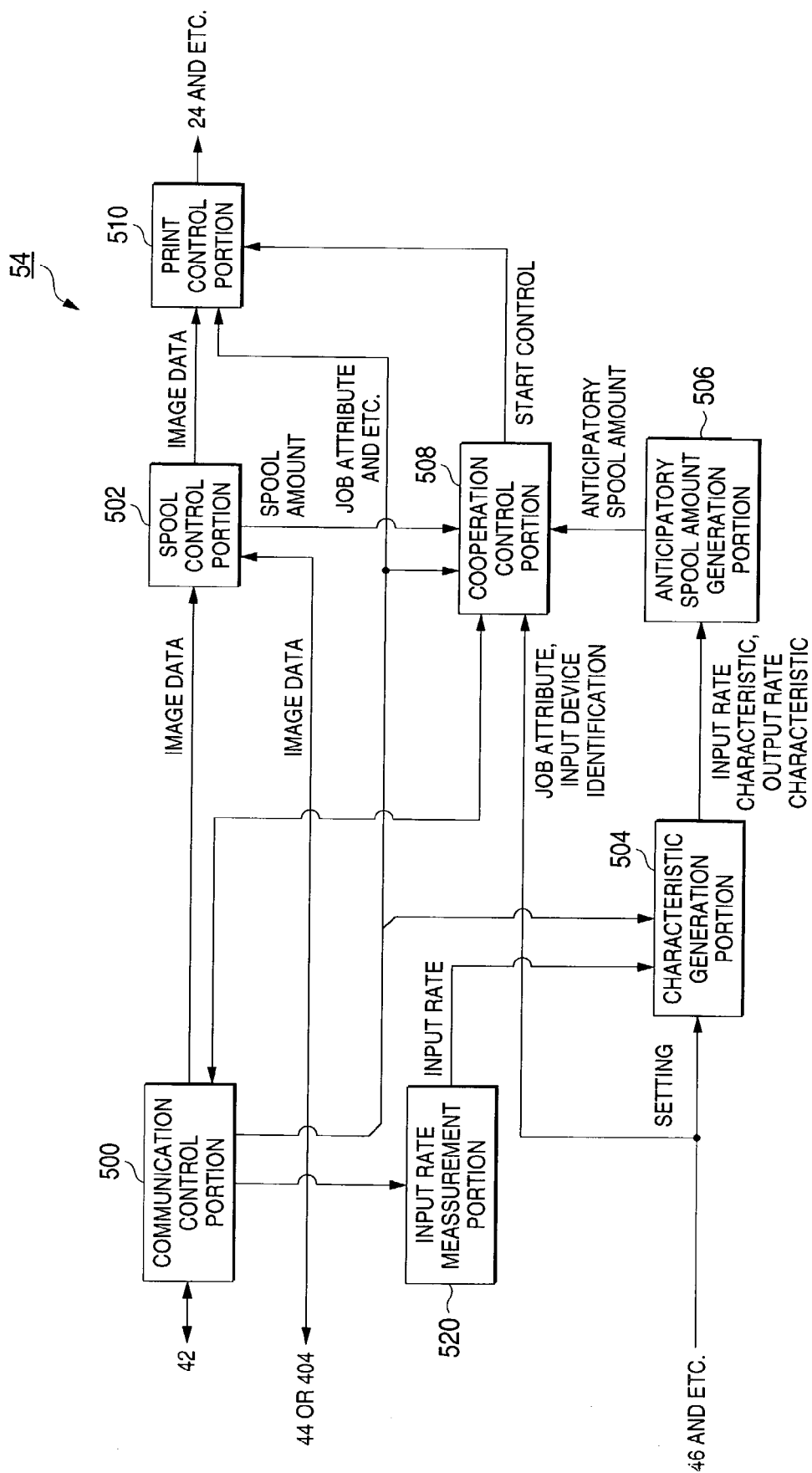
FIG. 27 shows a diagram showing the configuration of a third print control program executed by the control device (FIG. 7) of the printer apparatus.

FIG. 27 is a diagram showing the configuration of a third print control program 54 executed by the control device 4 (FIG. 7) of the printer apparatus 2.

Figure 28:
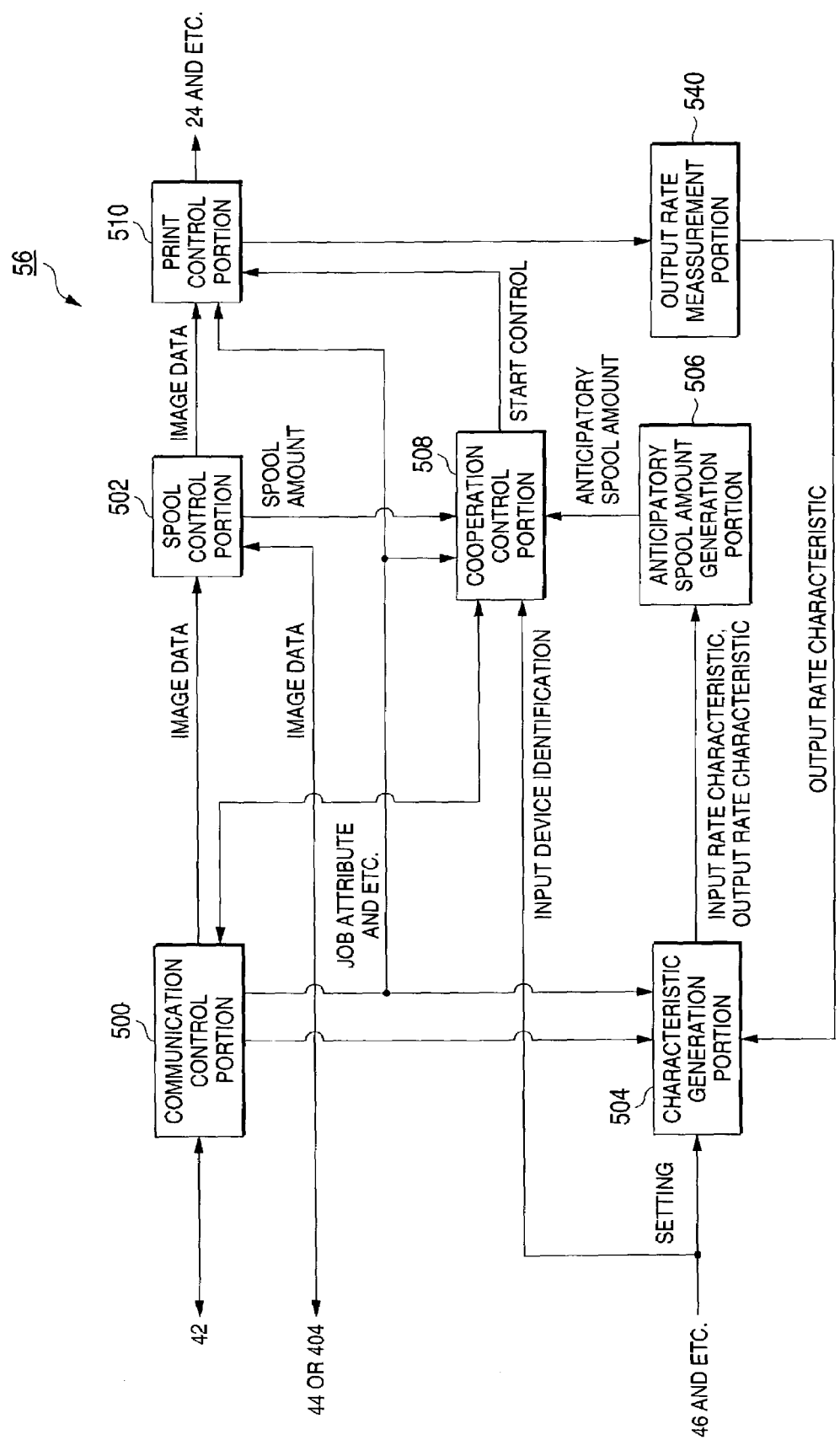
FIG. 28 shows a diagram showing the configuration of a fourth print control program executed by the control device (FIG. 7) of the printer apparatus.

FIG. 28 is a diagram showing the configuration of a fourth print control program 56 executed by the control device 4 (FIG. 7) of the printer apparatus 2.

Of the constituent portions of the third and fourth print control programs 54, 56 shown in FIGS. 27 and 28, the portions which are substantially same as those of the first and second print control programs 50, 52 shown in FIGS. 11 and 20 are labeled with the same symbols.

As shown in FIG. 27, the print control program 54 is configured in a manner that only the input rate measuring portion 520 (FIG. 20) is added to the print control program 50 (FIG. 11). Also, as shown in FIG. 28, the print control program 56 is configured in a manner that only the output rate measuring portion 540 is added to the print control program 50.

As shown in FIGS. 27 and 28, one of the input rate measuring portion 520 and the output rate measuring portion 540 (FIG. 20) may be added to the print control program 50.

As described above, according to the image generating method and the image forming method of the invention, it is possible in the image forming apparatus to permit image formation to be started before receiving all the image data generated on the image generating apparatus side.

What is claimed is:

1. An image forming system comprising:
an image generation apparatus; and
an image forming apparatus,
wherein the image generation apparatus has:
a generating section for generating image data at a first data rate; and
a transmitting section for transmitting first data rate information indicating the first data rate and the generated image data to the image forming apparatus,
wherein the image forming apparatus has:
a receiving section for receiving the transmitted first data rate information and the transmitted image data;
a storing section for storing the received image data;
an image forming section for forming an image from the stored image data at a second data rate; and
a calculating section for calculating a data amount of image data which should be stored from a time when the reception of the image data is started to a time when the formation of the image is started based on the received first data rate information and the second data rate, and
wherein the image forming section of the image forming apparatus starts the formation of the image from the stored image data when the calculated data amount of image data is stored.

2. The image forming system according to claim 1, wherein the first data rate information includes identification information for identifying the generating section and process attribute information for specifying at least one of the image generation by the image generation apparatus and the image forming processing by the image forming apparatus.

3. The image forming apparatus according to claim 2, wherein the image forming apparatus further has a third measuring section for measuring third data rate indicating a data rate of the received image data; and
wherein the calculating section of the image forming apparatus calculates the data amount of image data which should be stored from the time when the reception of the image data is started to the time when the formation of the image is started based on the received first data rate information, the second data rate, and the measured third data rate.

4. The image forming system according to claim 2, wherein the image forming apparatus further has a second measuring section for measuring the second data rate of the image forming section; and
wherein the calculating section of the image forming apparatus calculates the data amount of image data which should be stored from the time when the reception of the image data is started to the time when the formation of the image is started based on at least the received first data rate information and the measured second data rate.

5. The image forming system according to claim 2, wherein the image generation apparatus further has a first measuring section for measuring the first data rate of the generating section; and
wherein the transmitting section of the image generation apparatus transmits the measured first data rate to the image forming apparatus.

6. The image forming system according to claim 2, wherein the image generation apparatus further has a first measuring section for measuring the first data rate of the generating section;
wherein the transmitting section of the image generation apparatus transmits the measured first data rate to the image forming apparatus;
wherein the image forming apparatus further has:
a second measuring section for measuring the second data rate of the image forming section; and
a third measuring section for measuring a third data rate indicating a data rate of the received image data, and
wherein the calculating section of the image forming apparatus calculates the data amount of image data which should be stored from the time when the reception of the image data is started to the time when the formation of the image is started based on the received first data rate information, the measured second data rate, and third data rate.

7. The image forming system according to claim 1, wherein the image forming apparatus forms the image from the stored image data at the second data rate lower than the first data rate.

8. The image forming system according to claim 1, wherein at least one of a case where the transmitted image data is delayed and a case where the image is formed earlier, the calculating section calculates the data amount of image data which should be stored from the time when the reception of the image data is started to the time when the formation of the image is started so that the image data has been stored in the storing section.

9. The image forming system according to claim 1, wherein the image forming apparatus is a printer apparatus for printing the stored image data on an output sheet.

10. The image forming system according to claim 9, wherein the image generation apparatus is a scanner apparatus connected to the printer apparatus through a network for sending a document at a constant rate, generating image data of the sent document, and transmitting the generated image data to the printer apparatus through the network.

11. The image forming system according to claim 10, wherein the first data rate information includes at least one of whether the image generation apparatus has an automatic document feeding device, whether the automatic document feeder device is in use, an order of feeding documents, whether the image generation apparatus has a function of reading a double-sided document, whether the function of reading a double-sided document is in use, and the size of document; and
wherein the process attribute information includes at least one of information indicating a resolution of a formed image, information indicating number of gradation levels of the formed image, information indicating type of the document, and information indicating image processing performed by the generating section of the image generation apparatus.

12. The image forming system according to claim 10 wherein the process attribute includes at least one of information indicating whether the image forming apparatus has a post-processing device, whether the post-processing device is in use, an order of forming the image, whether the image forming apparatus has a function of forming double-sided images, whether the function of forming double-sided images is in use, the size of the document, a resolution of the image formation, and type of the document.

13. The image forming system according to claim 1, wherein the first data rate is substantially constant.

14. An image generation apparatus for an image forming system comprising an image forming apparatus, the image generation apparatus comprising:
a generating section for generating image data at a first data rate; and
a transmitting section for transmitting a first data rate information indicating the first data rate and the generated image data to the image forming apparatus,
wherein the image forming apparatus receives first data rate information indicating the data rate of the generated image data and the image data, stores the received image data, forms an image at a second data rate from the stored image data, calculates a data amount of image data which should be stored from a time when the reception of the image data is started to a time when the formation of the image is started, and starts the formation of the image from the stored image data when the calculated data amount of image data is stored.

15. An image forming apparatus comprising:
a receiving section for receiving transmitted first data information and transmitted image data;
a storing section for storing the received image data;
an image forming section for forming an image from the stored image data at a second data rate; and
a calculating section for calculating a data amount of image data which should be stored from a time when the reception of the image data is started to a time when the formation of the image is started based on the received first data rate information and the second data rate, wherein the image forming section of the image forming apparatus starts the formation of the image from the stored image data when the calculated data amount of image data is stored.

16. An image generating/forming method comprising the steps of:
    generating image data at a first data rate;
    transmitting first data rate information indicating the first data rate and the generated image data;
    receiving the transmitted first data rate information and the transmitted image data;
    storing the received image data;
    forming an image from the stored image data at a second data rate;
    calculating a data amount of image data which should be stored from a time when the reception of the image data is started to a time when the formation of the image is started based on the received first data rate information and the second data rate; and
    starting the formation of the image from the stored image data when the calculated data amount of image data is stored.

17. An image generating method for generating image data for forming an image, the method comprising the steps of:
    generating image data at a first data rate; and
    transmitting first data rate information indicating the first data rate and the generated image data,
    wherein an image formation is performed by receiving the first data rate information indicating a data rate of the generated image data and the generated image data, storing the received image data, forming an image from the stored image data at a second data rate, calculating a data amount of image data which should be stored from a time when the reception of the image data is started to a time when the formation of the image is started based on the received first data rate information and the second data rate, and starting the formation of the image from the stored image data when the calculated data amount of image data is stored.

18. An image forming method comprising the steps of:
    receiving transmitted first data rate information, and transmitted image data;
    storing the received image data;
    forming an image from the stored image data at a second data rate;
    calculating a data amount of image data which should be stored from a time when the reception of the image data is started to a time when the formation of the image is started based on the received first data rate information and the second data rate; and
    starting the formation of the image from the stored image data when the calculated data amount of image data is stored.

19. A program stored in a computer readable medium, the program controlling a processor performing one or more processes comprising:
    generating image data at a first data rate;
    transmitting first data rate information indicating the first data rate and the generated image data, and
    causing a second computer to execute the steps of:
    receiving the transmitted first data rate information and the transmitted image data;
    storing the received image data;
    forming an image from the stored image data at a second data rate;
    calculating a data amount of image data which should be stored from a time when the reception of the image data is started to a time when the formation of the image is started based on the received first data rate information and the second data rate; and
    starting the formation of the image from the stored image data when the calculated data amount of image data is stored.

20. A program stored in a computer readable medium, the program controlling a processor performing one or more processes comprising:
    generating image data at a first data rate; and
    transmitting first data rate information indicating the first data rate and the generated image data,
    wherein an image formation is performed by receiving the first data rate information indicating a data rate of the generated image data and the generated image data, storing the received image data, forming an image from the stored image data at a second data rate, calculating a data amount of image data which should be stored from a time when the reception of the image data is started to a time when the formation of the image is started based on the received first data rate information and the second data rate, and starting the formation of the image from the stored image data when the calculated data amount of image data is stored.

21. A program stored in a computer readable medium, the program controlling a processor performing one or more processes comprising:
    receiving transmitted first data rate information, and transmitted image data;
    storing the received image data;
    forming an image from the stored image data at a second data rate;
    calculating a data amount of image data which should be stored from a time when the reception of the image data is started to a time when the formation of the image is started based on the received first data rate information and the second data rate; and
    starting the formation of the image from the stored image data when the calculated data amount of image data is stored.

* * * * *